United States Patent
Okuyama et al.

(10) Patent No.: US 8,427,736 B2
(45) Date of Patent: *Apr. 23, 2013

(54) ILLUMINATION DEVICE, DISPLAY DEVICE, AND METHOD OF MANUFACTURING LIGHT MODULATOR

(75) Inventors: Kentaro Okuyama, Miyagi (JP); Harumi Sato, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/110,301

(22) Filed: May 18, 2011

(65) Prior Publication Data
US 2011/0217629 A1 Sep. 8, 2011

Related U.S. Application Data

(62) Division of application No. 12/644,820, filed on Dec. 22, 2009, now Pat. No. 7,990,605.

(30) Foreign Application Priority Data

Dec. 26, 2008 (JP) ................. 2008-334658

(51) Int. Cl.
*G02B 26/00* (2006.01)
*G02F 1/29* (2006.01)
(52) U.S. Cl.
USPC ........... 359/296; 359/298; 359/315; 359/316; 359/318; 345/84; 345/107
(58) Field of Classification Search .............. 359/296, 359/298, 315, 316, 318; 345/55, 84, 87, 345/107; 216/41–44, 51
See application file for complete search history.

(56) References Cited

U.S. PATENT DOCUMENTS

| 7,679,589 | B2 * | 3/2010 | Park ................. 345/87 |
| 7,852,546 | B2 * | 12/2010 | Fijol et al. .......... 359/291 |
| 7,990,605 | B2 * | 8/2011 | Okuyama et al. ..... 359/296 |
| 2007/0085788 | A1 * | 4/2007 | Harada et al. ........ 345/84 |

FOREIGN PATENT DOCUMENTS

| JP | 06-347790 | 12/1994 |
| JP | 07-199184 | 8/1995 |
| JP | 10-133591 | 5/1998 |
| JP | 11-142843 | 5/1999 |
| JP | 11-212088 | 8/1999 |
| JP | 2000-1474941 | 5/2000 |
| JP | 2004-253335 | 9/2004 |
| JP | 2005-221756 | 8/2005 |

OTHER PUBLICATIONS

Japanese Office Action issued Feb. 9, 2011, corresponding to Japanese Appln. No. 2008-334658.

* cited by examiner

*Primary Examiner* — Evelyn A. Lester
(74) *Attorney, Agent, or Firm* — K&L Gates LLP

(57) ABSTRACT

An illumination device is provided and has a light guide plate, a light source and a light modulator, wherein the light modulator has a pair of transparent substrates a pair of electrodes and a light modulator layer. The light modulator layer includes a first region being changed between a transparent state and a scatterable state depending on intensity of an electric field, and a second region being more transparent than the first region in a scatterable state at an electric field having a certain intensity, the electric field being applied when the first region is changed between the transparent state and the scatterable state, and an occupancy rate of the first region in the light modulator layer is increased with increase in distance from the light source.

2 Claims, 15 Drawing Sheets

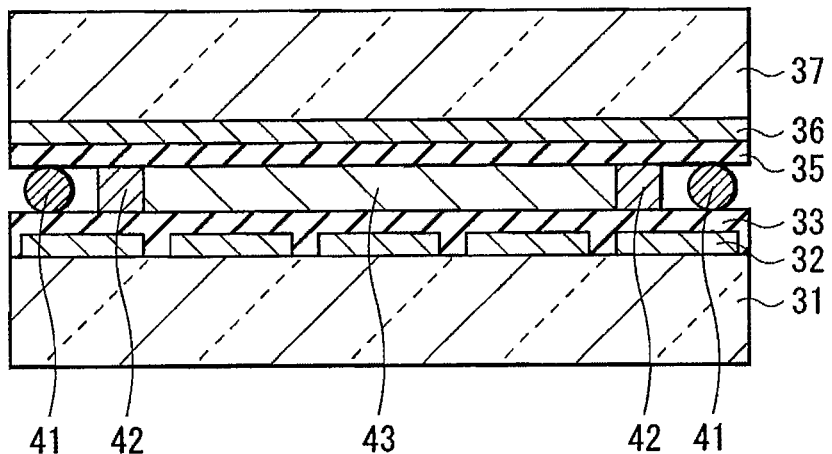
FIG. 16A
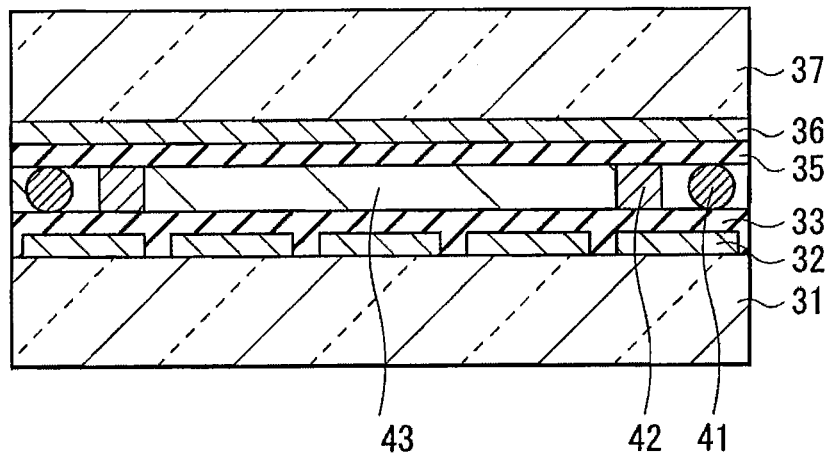
FIG. 16B
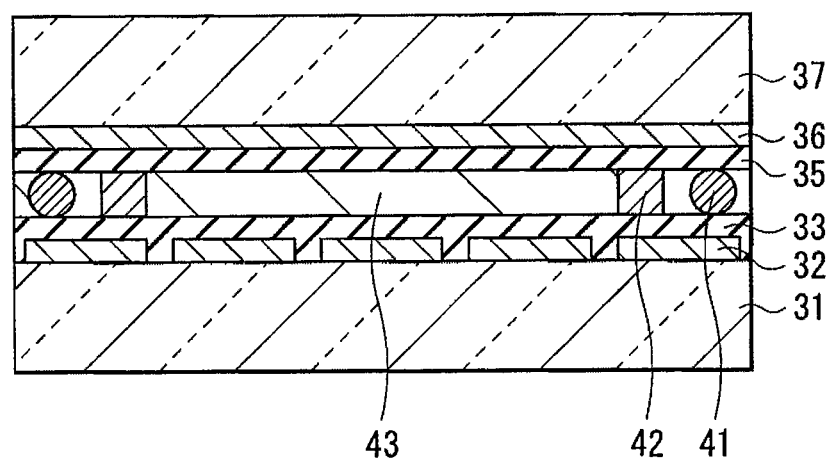
FIG. 16C

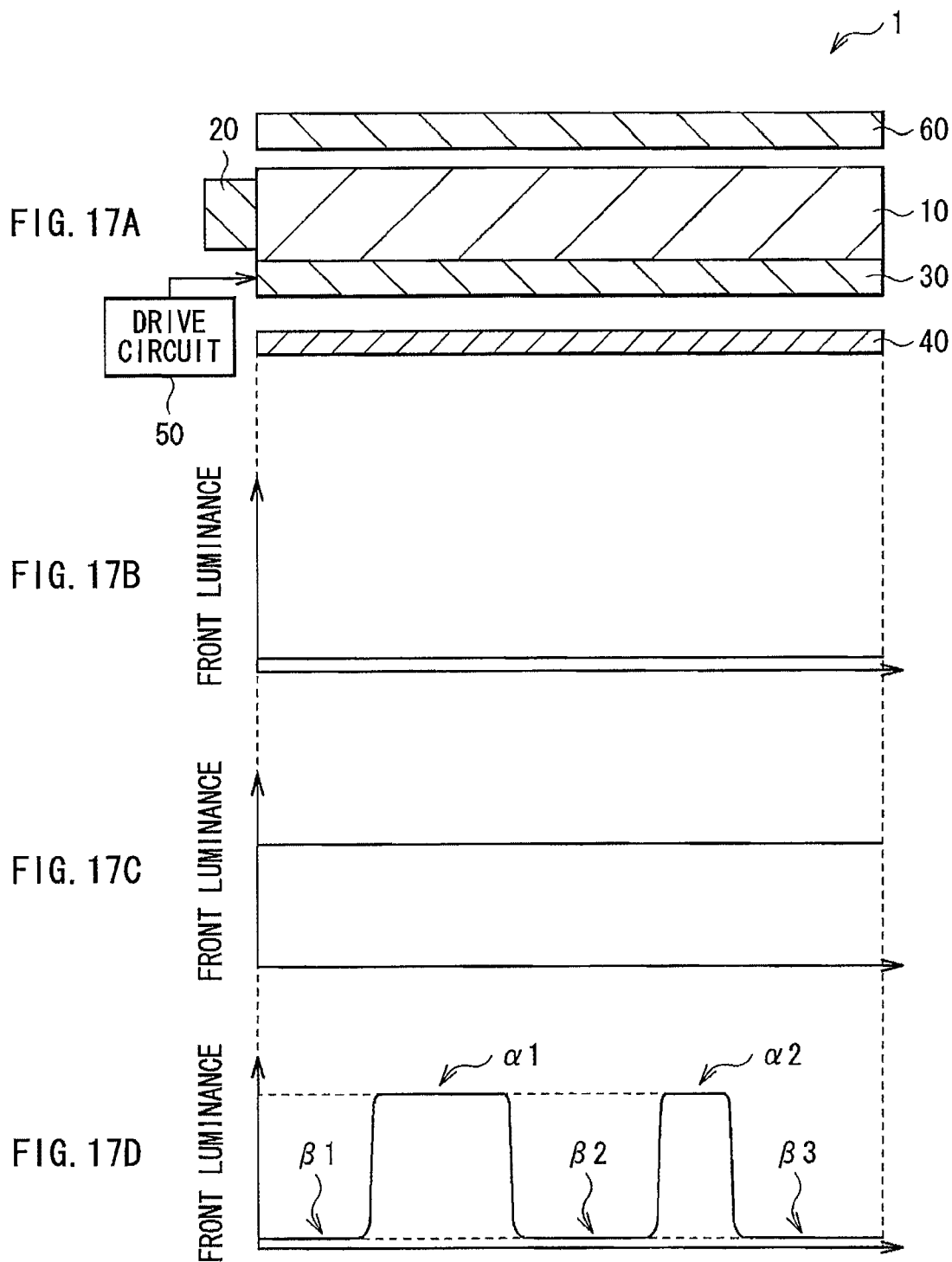

ILLUMINATION DEVICE, DISPLAY DEVICE, AND METHOD OF MANUFACTURING LIGHT MODULATOR

CROSS REFERENCES TO RELATED APPLICATIONS

The present application is a divisional of U.S. application Ser. No. 12/644,820, filed Dec. 22, 2009, which claims priority to Japanese Priority Patent Application JP 2008-334658 filed in the Japan Patent Office on Dec. 26, 2008, the entire content of which is hereby incorporated by reference.

BACKGROUND

The present disclosure relates to an illumination device and a display device, each device having a light modulator that may scatter or transmit light, and a method of manufacturing the light modulator.

Recently, a liquid crystal display is remarkably improved in image quality or remarkably advanced in power saving, and a method is proposed to improve scotopic contrast, where the contrast is improved by partially modulating intensity of light from a backlight. The method is largely designed to partially drive light emitting diodes (LED) as a light source of a backlight so that light from the backlight is modulated in accordance with a display image. Furthermore, thickness reduction is now increasingly demanded not only to a small liquid crystal display, but also to a large liquid crystal display. Therefore, an edge light type of backlight, where a light source is disposed at an end of a light guide plate, is noted instead of a backlight type where a cold cathode fluorescent lamp (CCFL) or LED is disposed directly below a liquid crystal panel. However, the edge light type is hard to enable partial drive of partially modulating light intensity of a light source.

For example, Japanese Unexamined Patent Application, Publication No. 6-347790 proposes a display device using a polymer dispersed liquid crystal (PDLC), which is changed between a transparent state and a scatterable state, as a technique of extracting light being propagated through the light guide plate. This is a technique for preventing mirroring, where voltage is partially applied to the PDLC so that the PDLC is partially changed between the transparent state and the scatterable state.

In the edge light backlight, for example, a technique is known, in which a printing pattern, coarseness of a light extraction pattern, or size of a pattern is changed depending on a distance from a light source such as LED or CCFL (for example, refer to Japanese Unexamined Patent Application, Publication No. 11-142843). The technique described in the Patent Application is a kind of technique for uniformly extracting light from a light guide plate, and designed only in consideration of light extraction. In addition, for example, a technique is known as a technique for making luminance uniform in a plane, in which light diffusivity of a diffuser sheet is gradually changed in accordance with a distance from a light source (for example, refer to Japanese Unexamined Patent Application, Publication No. 2004-253335).

For example, it is considered that the technique of the Patent Application, Publication No. 11-142843 or 2004-253335 is combined with the PDLC of the Patent Application, Publication No. 6-347790 so that luminance of light from the backlight is made uniform in a plane. However, in such a case, while luminance may be made uniform, luminance in dark display is increased, resulting in a difficulty that a modulation ratio between bright display luminance and dark display luminance may not be increased.

It is desirable to provide an illumination device and a display device, in which a modulation ratio may be increased while luminance is made uniform in a plane, and a method of manufacturing a light modulator.

SUMMARY

An illumination device according to an embodiment includes a light guide plate, a light source disposed on a side face of the light guide plate, and a light modulator being disposed on a surface or in the inside of the light guide plate, and being adhered to the light guide plate. The light modulator has a pair of transparent substrates separately disposed in an opposed manner to each other, a pair of electrodes provided on respective surfaces of the pair of transparent substrates, and a light modulator layer provided in a gap between the pair of transparent substrates. The light modulator layer includes a first region being changed between a transparent state and a scatterable state depending on intensity of an electric field, and a second region being more transparent than the first region in a scatterable state at an electric field having a certain intensity, the electric field being applied when the first region is changed between the transparent state and the scatterable state. An occupancy rate of the first region in the light modulator layer is increased with increase in distance from the light source.

A display device according to an embodiment includes a display panel having a plurality of pixels arranged in a matrix pattern, the pixels being driven according to an image signal, and an illumination device illuminating the display panel. The illumination device incorporated in the display device has the same configuration as that of the above illumination device.

According to the illumination device and the display device of the embodiments, the light modulator layer is provided in the light modulator adhered to the light guide plate, the light modulator layer including the first region being changed between a transparent state and a scatterable state depending on intensity of an electric field, and the second region being more transparent than the first region in a scatterable state at an electric field having a certain intensity, the electric field being applied when the first region is changed between the transparent state and the scatterable state. Thus, light, which is emitted from the light source, and propagated through the light guide plate, is transmitted through a region being transparent by controlling an electric field, and perfectly reflected or reflected at a high reflectance by an interface of one transparent substrate. As a result, luminance of a region corresponding to a region being transparent in a light emitting area of the illumination device (hereinafter, simply referred to as transparent region in the light emitting area) is decreased compared with a case where the light modulator is not provided. In contrast, light propagated through the light guide plate is scattered by a region, which has light-scattering ability by controlling an electric field, of the light modulator layer, and transmitted through the interface of the transparent substrate. As a result, luminance of a region corresponding to a region that has light-scattering ability in the light emitting area of the illumination device (hereinafter, simply referred to as scattering region in the light emitting area) is increased compared with the case where the light modulator is not provided. In addition, partial white-display luminance (luminance raise) is increased by a level corresponding to decrease in luminance of the transparent region in the light emitting area. Furthermore, according to the embodiments of the invention, an occupancy rate of the first region in the light modulator layer is increased with increase in distance from the light source. Thus, luminance on a light source side of the light emitting area of the illumination device is controlled to be low compared with the case where the light modulator is not provided, and luminance on a side opposite to the light source side of the light emitting area of the illumination device is increased compared with the case where the light modulator is not provided.

A method of manufacturing a light modulator according to an embodiment includes the following two steps.

(A) A first step of disposing two transparent substrates, each transparent substrate having an electrode and an alignment film formed sequentially on its surface, such that respective alignment films are opposed to each other, and attaching the transparent substrates to each other with a mixture of a liquid crystal material and a polymerizable material in between, and then disposing a mask on the attached transparent substrates, the mask having an open area ratio varying depending on a distance from a region where a light source is to be disposed.

(B) A second step of irradiating light to the polymerizable material via the mask to polymerize the polymerizable material, thereby forming a first region being changed between a transparent state and a scatterable state depending on intensity of an electric field, and a second region being more transparent than the first region in a scatterable state at an electric field having a certain intensity, the electric field being applied when the first region is changed between the transparent state and the scatterable state.

According to the method of manufacturing a light modulator of the embodiment, the mixture of a liquid crystal material and a polymerizable material is provided between the two transparent substrates, and then light is irradiated to the polymerizable material. Thus, the polymerizable material is polymerized, and besides, the liquid crystal material and the polymerizable material are phase-separated from each other. The light is irradiated to the polymerizable material via the mask. Therefore, the first region being changed between a transparent state and a scatterable state depending on intensity of an electric field, and a second region being more transparent than the first region in a scatterable state at an electric field having a certain intensity, the electric field being applied when the first region is changed between the transparent state and the scatterable state are formed in accordance with intensity of irradiated light and a mask pattern. Moreover, the mask varies in open area ratio depending on a distance from a region where the light source is to be disposed. Therefore, an occupancy rate of the first region in the mixture may be varied depending on the distance from the region where the light source is to be disposed. In this way, according to the embodiment of the invention, light irradiation using the mask enables that the first and second regions are formed in the mixture with an occupancy rate depending on the distance from the region where the light source is to be disposed.

When the light modulator formed in this way is applied to an illumination device of a light guide plate type, light, which is emitted from the light source, and propagated through the light guide plate, is transmitted through a region being transparent by controlling an electric field, and perfectly reflected or reflected at a high reflectance by the interface of one transparent substrate. As a result, luminance of the transparent region in the light emitting area may be decreased compared with the case where the light modulator is not provided. In contrast, light propagated through the light guide plate is scattered by a region, which has light-scattering ability by controlling an electric field, of the mixture, and transmitted through the interface of the transparent substrate. Thus, luminance of the scattering region in the light emitting area may be increased compared with the case where the light modulator is not provided. In addition, partial white-display luminance may be increased by a level corresponding to decrease in luminance of the transparent region in the light emitting area. Moreover, luminance on a light source side of the light emitting area may be controlled to be low compared with the case where the light modulator is not provided, and luminance on a side opposite to the light source side of the light emitting area may be increased compared with the case where the light modulator is not provided.

According to the illumination device, the display device and the method of manufacturing a light modulator of the embodiments, luminance on a light source side of the light emitting area of the illumination device may be controlled to be low compared with the case where the light modulator is not provided, and luminance on a side opposite to the light source side of the light emitting area of the illumination device may be increased compared with the case where the light modulator is not provided. Thus, a modulation ratio may be increased while luminance is made uniform in a plane.

According to the method of manufacturing a light modulator of the embodiment, light irradiation using the mask enables that the first and second regions are formed in the mixture with an occupancy rate depending on a distance from the region where the light source is to be disposed. Thus, a light modulator having uniform luminance in a plane and a high modulation ratio may be manufactured by a simple method.

Additional features and advantages are described herein, and will be apparent from the following Detailed Description and the figures.

BRIEF DESCRIPTION OF THE FIGURES

FIGS. 16A to 16C are section views for illustrating manufacturing steps subsequent to FIGS. 15A to 15C.

FIGS. 17A to 17D are characteristic diagrams for illustrating front luminance of the backlight of FIG. 1.

DETAILED DESCRIPTION

Hereinafter, embodiments will be described in detail with reference to drawings. Description is made in the following order.

1. First embodiment (backlight, normally-white PDLC)
2. Modification (position of light modulator, addition of optical sheet)
3. Second embodiment (backlight, reverse PDLC)
4. Application example (display device)

First Embodiment

Figure 1A:
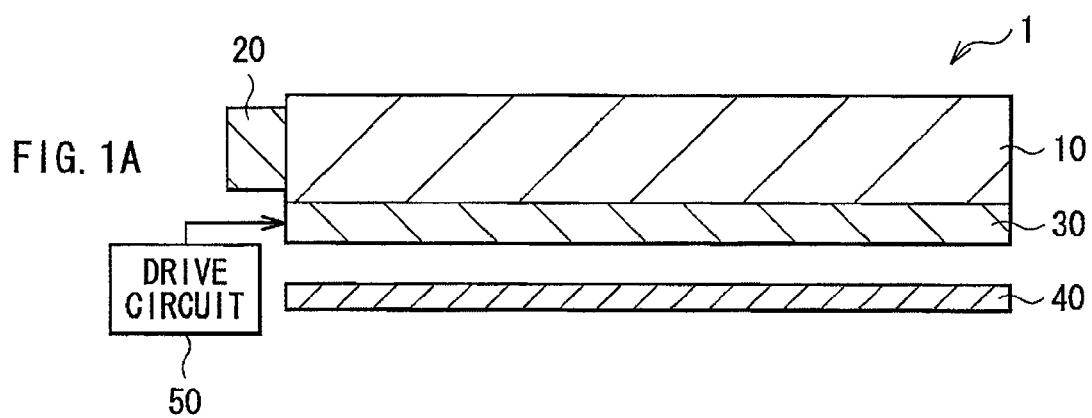
FIGS. 1A and 1B are section views showing an example of a configuration of a backlight according to a first embodiment of the invention.
Figure 1B:
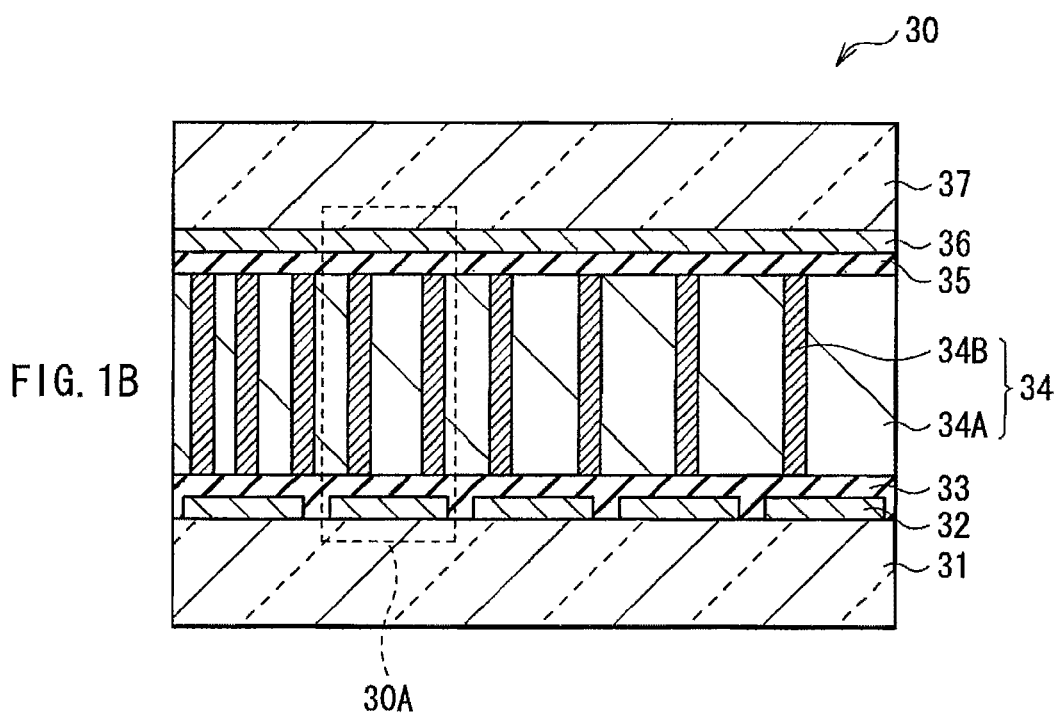

FIG. 1A shows an example of a sectional configuration of a backlight 1 (illumination device) according to a first embodiment. FIG. 1B shows an example of a sectional configuration of a light modulator 30 (described later) incorporated in the backlight 1 of FIG. 1A. FIGS. 1A and 1B schematically show the examples, and therefore a dimension or shape is not limited to be the same as an actual dimension or shape in the figures. The backlight 1, for example, illuminates a liquid crystal display panel from the back of the panel, and includes a light guide plate 10, a light source 20 disposed on a side face of the light guide plate 10, a light modulator 30 and a reflector plate 40, which are disposed in the back of the light guide plate 10, and a drive circuit 50 driving the light modulator 30.

The light guide plate 10 guides light from the light source 20, which is disposed on the side face of the light guide plate 10, to a top of the light guide plate 10. The light guide plate 10 has a shape in correspondence to a display panel (not shown) disposed on the top of the light guide plate 10, for example, a rectangular prism shape enclosed by the top, a bottom and side faces. For example, the light guide plate 10 has a predetermined, patterned shape on at least one of the top and the bottom, and thus has a function of scattering light injected from the side face, and uniforming the light. The light guide plate 10 need not necessarily have the shape, and, for example, may have a three-dimensional shape enclosed by flat surfaces. For example, the light guide plate 10 even acts as a supporter supporting an optical sheet (for example, a diffuser plate, a diffuser sheet, a lens film, and a polarization separation sheet). For example, the light guide plate 10 mainly includes transparent thermoplastic resin such as polycarbonate resin (PC) or acrylic resin (polymethylmethacrylate (PMMA)).

The light source 20 is a linear light source, and for example, includes a hot cathode fluorescent lamp (HCFL), CCFL, or a plurality of LED arranged in a line. The light source 20 may be provided on only one side face of the light guide plate 10 as shown in FIG. 1A, or may be provided on two, three or all side faces of the light guide plate 10.

The reflector plate 40 returns light, which is leaked from the back of the light guide plate 10 via the light modulator 30, to a side of the light guide plate 10, and for example, has a function of reflecting, diffusing, or scattering the light. Thus, light emitted from the light source 20 may be efficiently used, and besides front luminance is increased. The reflector plate 40, for example, includes PET (polyethylene terephthalate) foam, a silver-evaporated film, a multilayer reflection film, or white PET.

In the embodiment, the light modulator 30 adheres to the back (bottom) of the light guide plate 10 without inserting an air layer, and is bonded to the back of the plate 10 via an adhesive (not shown) or the like. The light modulator 30 is, for example, formed by disposing a transparent substrate 31, a lower electrode 32, an alignment film 33, a light modulator layer 34, an alignment film 35, an upper electrode 36 and a transparent substrate 37 in order from a side of the reflector plate 40 as shown in FIG. 1B.

Figure 2:
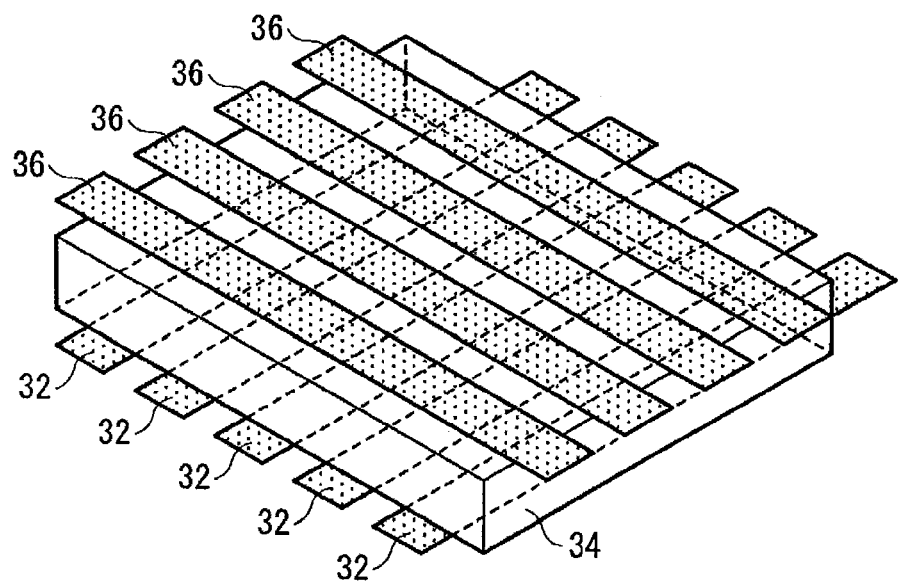
FIG. 2 is a section view showing an example of a configuration of electrodes in FIG. 1.

The transparent substrate 31 or 37 supports the light modulator layer 34, and typically includes a substrate transparent to visible light, for example, a glass plate or a plastic film. The lower electrode 32 is provided on a surface of the transparent substrate 31, the surface being opposed to the transparent substrate 37, and for example, has a beltlike shape extending in one direction in a plane as shown in FIG. 2 showing a relevant part of the light modulator 30. The upper electrode 36 is provided on a surface of the transparent substrate 37, the surface being opposed to the transparent substrate 31, and for example, has a beltlike shape extending in one direction in a plane, the direction being corresponding to a direction intersecting with (perpendicular to) the extending direction of the lower electrodes 32, as shown in FIG. 2.

The upper and lower electrodes 32 and 36 are shaped in connection with a drive method. For example, when the electrodes have the beltlike shape respectively, the electrodes may be driven by a simple matrix drive. When one of the electrodes is shaped to be a solid film, and the other is shaped to be small squares, the electrodes may be driven, for example, by an active matrix drive.

Figure 3:
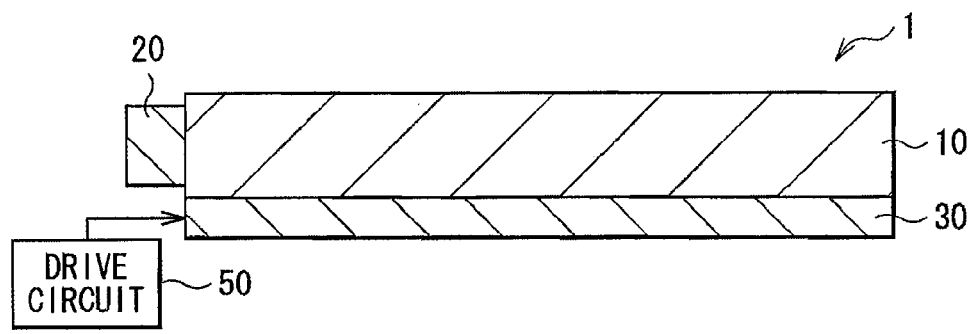
FIG. 3 is a section view showing another example of the configuration of the backlight in FIG. 1.

In the upper and lower electrodes 32 and 36, at least the upper electrode 36 (electrode on a top side of the backlight 1) includes a transparent conductive material, for example, indium tin oxide (ITO). However, the lower electrode 32 (electrode on a bottom side of the backlight 1) may not include a transparent material, and may include metal or the like. When the lower electrode 32 includes metal, the lower electrode 32 further has a function of reflecting light incident to the light modulator 30 from the back of light guide plate 10 as performed by the reflector plate 40. In this case, for example, the reflector plate 40 may not be provided as shown in FIG. 3.

When the lower electrode 32 and the upper electrode 36 are viewed in a normal direction to the light modulator 30, portions of the light modulator 30 configure light modulator cells 30A, the portions being corresponding to regions where the upper and lower electrodes 32 and 36 are opposed to each other. Each light modulator cell 30A may be independently driven by applying a predetermined voltage between the upper and lower electrodes 32 and 36, and transmits or scatters light from the light source 20 depending on a voltage value applied between the electrodes. Such transmitting or scattering behavior of the cell is described in detail in conjunction with description of the light modulator layer 34.

The alignment film 33 or 35 is provided, for example, to align a liquid crystal or monomer used for the light modulator layer 34. While the alignment film includes, for example, a vertical alignment film and a horizontal alignment film, the vertical alignment film is preferably used for the alignment film 33 or 35. For the vertical alignment film, a silane coupling agent, polyvinyl alcohol (PVA), a polyimide series material, a surfactant or the like may be used. These materials need not be subjected to rubbing processing for forming the alignment film, and is thus excellent in dust or static electricity. When a plastic film is used for the transparent substrate 31 or 37, baking temperature is preferably low to the utmost after the alignment film 33 or 35 is coated on a surface of the transparent substrate 31 or 37 in a manufacturing process, the silane coupling agent is preferably used for the alignment film 33 or 35 because alcohols may be used for the agent.

It is enough for either of the vertical and horizontal alignment films to have a function of aligning a liquid crystal and a monomer, and it is not necessary for the alignment films to have reliability to repeated voltage application being desired for a typical liquid crystal display. This is because the reliability to voltage application to a produced device is determined by an interface condition between a polymerized product of the monomer and the liquid crystal. Moreover, even if the alignment film is not used, a liquid crystal or a monomer used for the light modulator layer 34 may be aligned, for example, by applying an electric field or a magnetic field between the lower and upper electrodes 32 and 36. That is, while an electric field or a magnetic field is applied between the lower and upper electrodes 32 and 36, an alignment condition of the liquid crystal or the monomer under a voltage applied condition may be fixed by irradiating ultraviolet rays. When voltage is used for forming the alignment film, an alignment electrode and a drive electrode are separately formed, or a two-frequency liquid crystal, the dielectric constant of which reverses depending on frequency, may be used as the liquid crystal material. When a magnetic field is used for forming the alignment film, a material having a large magnetic susceptibility is preferably used for the alignment film, and for example, a material having many benzene rings is preferably used.

The light modulator layer 34 has, for example, two regions (first region 34A and second region 34B) different in optical characteristic at a certain electric-field intensity as shown in FIG. 1B. The first region 34A and the second region 34B have, for example, a columnar shape extending in a stacking direction of the light modulator 30 respectively. The first region 34A is, for example, formed filling the periphery of the second region 34B as shown in FIG. 2, and the second region 34B is dispersed within the first region 34A as viewed from a top of the light modulator layer 34.

Figure 4:
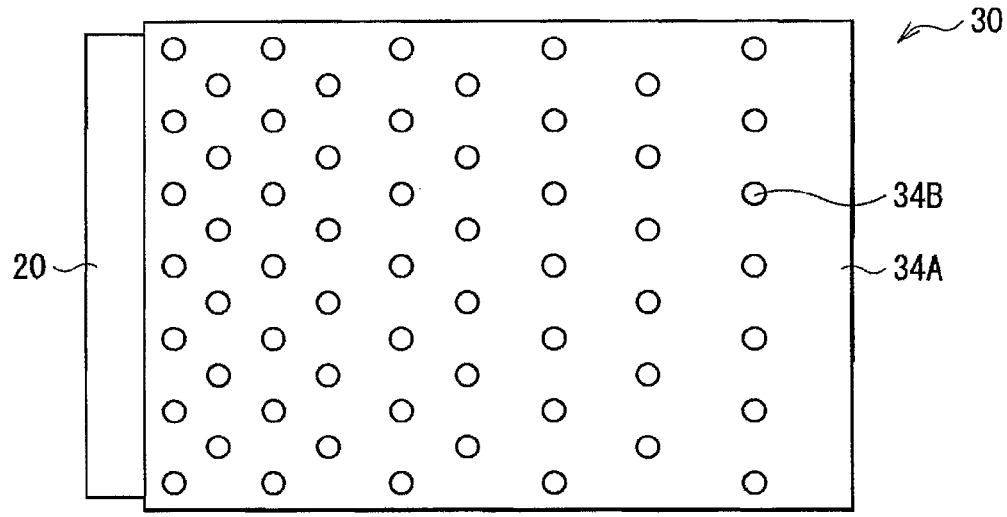
FIG. 4 is a plan view showing an example of a top configuration of a light modulator in FIG. 1.

The second region 34B has, for example, a cylindrical shape, an elliptical cylinder shape, or a prismatic shape. For example, diameter of the second region 34B is constant regardless of a distance from the light source 20, and for example, about several micrometers to several millimeters. The diameter of the second region 34B need not be necessarily constant, and, for example, may be decreased with increase in distance from the light source 20. When the diameter of the second region 34B is constant, an occupancy rate (density) of the second region 34B in the light modulator layer 34 is, for example, decreased with increase in distance from the light source 20 as shown in FIGS. 1B and 4. When the diameter of the second region 34B is decreased with increase in distance from the light source 20, number of the second region 34B per area is set such that an occupancy rate (density) of the region 34B in the light modulator layer 34 is decreased with increase in distance from the light source 20. Consequently, in each case, an occupancy rate of the first region 34A in the light modulator layer 34 is constant in a thickness direction, and increased with increase in distance from the light source 20 in an in-plane direction.

The first region 34A and the second region 34B need not necessarily have a columnar shape. For example, when the first region 34A has a bulk shape, and the second region 34B has a block shape, the light modulator layer 34 may be configured such that the second region 34B is dispersed in the first region 34A not only in an in-plane direction but also in a thickness direction. When the second region 34B is uniformly dispersed in the thickness direction, and dispersed more thinly with increase in distance from the light source 20 in an in-plane direction, an occupancy rate of the first region 34A in the light modulator layer 34 is the same in a thickness direction, and increased with increase in distance from the light source 20 in an in-plane direction. When the second region 34B is nonuniformly dispersed in the thickness direction, and dispersed more thinly with increase in distance from the light source 20 in an in-plane direction, an occupancy rate of the first region 34A in the light modulator layer 34 varies in a thickness direction, and is increased with increase in distance from the light source 20 in an in-plane direction.

The first region 34A includes, for example, a bulk 38A (third region) and fine particles 39A (fourth region). Similarly, the second region 34B includes, for example, a bulk 38B (fifth region) and fine particles 39B (sixth region). The fine particles 39A is fast in response speed to an electric field compared with the bulk 38A. Similarly, the fine particles 39B is fast in response speed to an electric field compared with the bulk 38B.

The bulk 38A or 38B is formed by curing an isotropic low-molecular material (for example, ultraviolet curing resin or thermosetting resin being nondirectional to the alignment film 33 or 35), and includes a polymeric material isotropic to light from the light source 20. The bulk 38A or 38B has, for example, a streaky or porous structure nonrespondent to an electric field. In contrast, the fine particles 39A or 39B mainly include, for example, a liquid crystal material. When the fine particles are applied with an electric field having certain intensity, the fine particles align in an electric field direction, and resultantly become optically anisotropic. When the fine particles are not applied with an electric field, the fine particles become optically isotropic. That is, the fine particles 39A or 39B become optically isotropic when they are aligned unlike the bulk 38A or 38B.

A weight ratio W1 between the fine particles 39A and the bulk 38A (weight of the fine particles 39A/weight of the bulk 38A) is different from a weight ratio W2 between the fine particles 39B and the bulk 38B (weight of the fine particles 39B/weight of the bulk 38B). Specifically, the weight ratio W2 is smaller than the weight ratio W1. The weight ratio W1 is, for example, 95/5 to 65/35, and the weight ratio W2 is, for example, 5/95 to 35/65. When the weight ratio W2 is within the exemplified range, the second region 34B may act as spacers for keeping a cell gap.

In the embodiment, both the first and second regions 34A and 34B are configured such that, depending on electric-field intensity, an optical axis of each of the fine particles 39A and 39B, for example, becomes perpendicular to a surface (hereinafter, called reference surface) parallel to a surface of each of the transparent substrates 31 and 37, or intersects with the surface at a shallow angle. Thus, each of the first and second regions 34A and 34B may be changed between a transparent state and a scatterable state as described later. However, a voltage for changing the first region 34A between the transparent state and the scatterable state, and a voltage for changing the second region 34B between the transparent state and the scatterable state are different from each other depending on a magnitude relationship between the weight ratios W1 and W2.

Hereinafter, an optical characteristic of each of the first and second regions 34A and 34B is described in detail while being classified into three cases. The classification is made focusing on three factors of (1) particle diameter of the fine particles 39B, (2) magnitude relationship between the weight ratios W1 and W2, and (3) an occupancy rate of the fine particles 39B in the second region 34B.

Case 1

Figure 5:
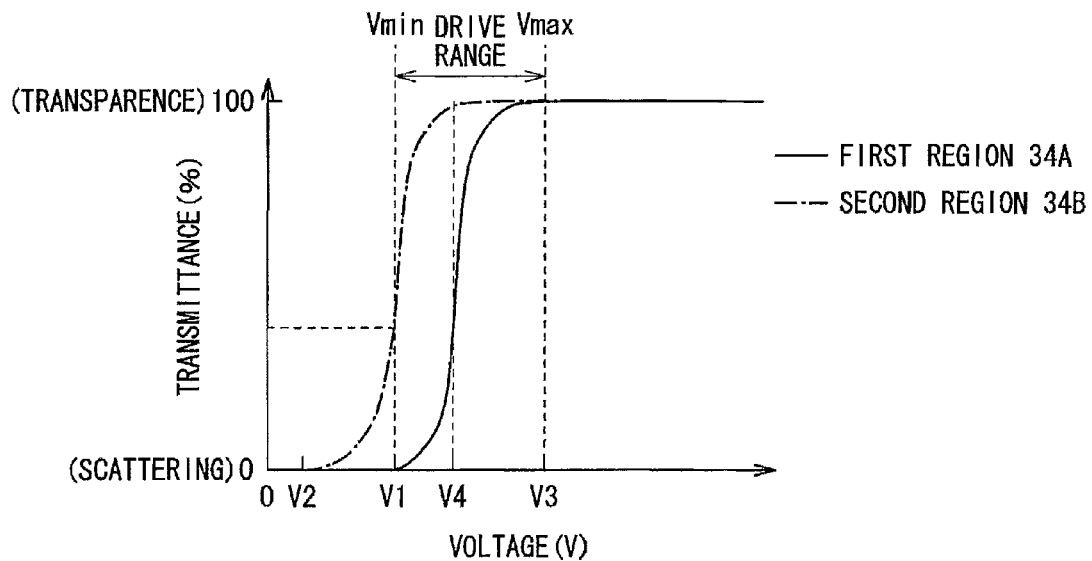
FIG. 5 is a relationship diagram showing an example of a relationship between voltage and transmittance in each of first and second regions of the light modulator in FIG. 1.

In this case, particle diameter of the fine particles 39B is larger than that of the fine particles 39A, so that a liquid crystal in the fine particles 39B easily moves compared with a liquid crystal in the fine particles 39A. As a result, for example, a drive start voltage V2 of the second region 34B is lower than a drive start voltage V1 of the first region 34A as shown in FIG. 5. FIG. 5 schematically shows a relationship between applied voltage and transmittance in each of the first and second regions 34A and 34B.

In the case 1, particle diameter of the fine particles 39B is larger than that of the fine particles 39A, and besides, the weight ratio W2 is smaller than the weight ratio W1. Therefore, the second region 34B has a low light-scattering ability during voltage application. As a result, as shown in FIG. 5, when the drive start voltage V1 is applied between electrodes, transmittance of the second region 34B is somewhat high, and the second region 34B is thus substantially transparent. In the case 1, a drive range defined as a range of a lower limit voltage $V_{min}$ to an upper limit voltage $V_{max}$ is, for example, set as V1 to V3, thereby the second region 34B may be kept to be transparent or substantially transparent while the first region 34A is changed between a transparent state and a scatterable state. The drive range may be a range other than the above, and, for example, may be 0 (zero) to V3. Hereinafter, an optical characteristic of each region in the case 1 is described.

Figures 6A, 6B:
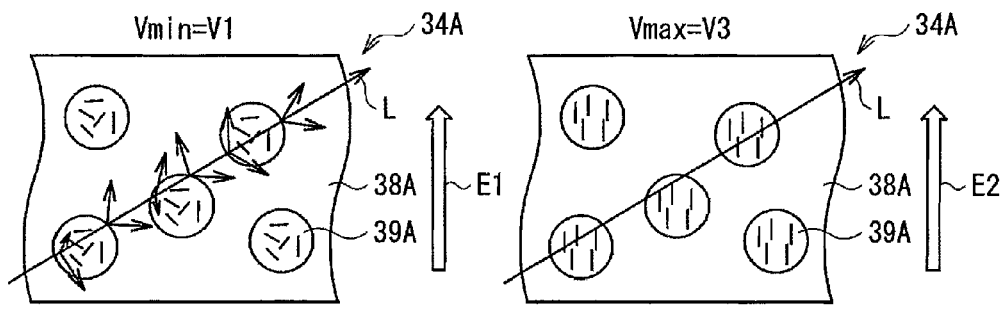
FIGS. 6A and 6B are schematic views for illustrating an example of operation of the first region in FIG. 5.
Figures 7A, 7B:
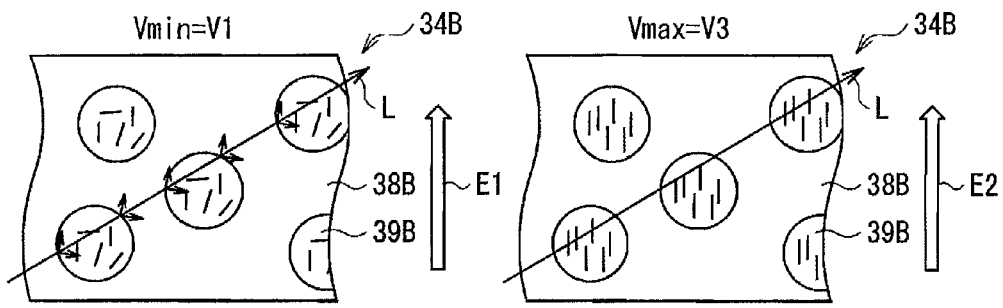
FIGS. 7A and 7B are schematic views for illustrating an example of operation of the second region in FIG. 5.

FIG. 6A schematically shows optical operation of the first region 34A in the case that the drive start voltage V1 of the first region 34A is applied as the lower limit voltage $V_{min}$ between electrodes. In this case, the bulk 38A is isotropic, and is not aligned. FIG. 6B schematically shows optical operation of the first region 34A in the case that a saturation voltage V3 of the first region 34A is applied as the upper limit voltage $V_{max}$ between electrodes. FIG. 7A schematically shows optical operation of the second region 34B in the case that the drive start voltage V1 is applied as the lower limit voltage $V_{min}$, between electrodes. In this case, the bulk 38B is optically isotropic, and is not aligned. FIG. 7B schematically shows optical operation of the second region 34B in the case that the saturation voltage V3 is applied as the upper limit voltage $V_{max}$ between electrodes.

When the drive start voltage V1 is applied between electrodes, for example, the liquid crystal in the fine particles 39A or 39B is oriented in a random direction regardless of a direction of an electric field E1, and thus not aligned as shown in FIGS. 6A and 7A. That is, the fine particles 39A or 39B are optically isotropic. In contrast, when the saturation voltage V3 is applied between electrodes, for example, the liquid crystal in the fine particles 39A or 39B is oriented in the same or approximately the same direction as a direction of an electric field E2, and thus aligned in a direction (hereinafter, simply called vertical direction) perpendicular to a surface of the transparent substrate 31 or 37 as shown in FIGS. 6B and 7B. That is, the fine particles 39A or 39B are optically anisotropic. In such a case, a light axis (line parallel to a forward direction of a beam, along which a refractive index has one value regardless of a polarization direction) of the liquid crystal in the fine particles 39A or 39B is oriented in the vertical direction. The light axis of the liquid crystal in the fine particles 39A or 39B need not be necessarily oriented in the vertical direction, and, for example, may be oriented in a direction intersecting with the vertical direction due to manufacturing errors or the like.

A refractive index of the bulk 38A or 38B is different from a refractive index of the fine particles 39A or 39B when the fine particles are optically isotropic. A refractive index of the bulk 38A is equal to or approximately equal to an extraordinary index of the fine particles 39A or 39B when the fine particles are optically anisotropic.

In the first region 34A, when the drive start voltage V1 is applied between electrodes, a difference in refractive index between the bulk 38A and the fine particles 39A is large in any direction. As a result, the first region 34A has a high light-scattering ability as shown in FIG. 6A. In contrast, in the second region 34B, for example, particle diameter of the fine particles 39B is larger than particle diameter of the fine particles 39A as shown in FIG. 7A, so that the liquid crystal in the fine particles 39B easily moves compared with the liquid crystal in the fine particles 39A. Thus, an orientation of the liquid crystal, which has been oriented in a random direction in the fine particles 39B, is displaced only slightly in the vertical direction by applying the drive start voltage V1 between electrodes, and a difference in refractive index between the bulk 38B and the fine particles 39B is thus decreased in each of oblique and lateral directions. As a result, the second region 34B becomes substantially transparent despite occurrence of slight scattering in the region 34B as shown in FIG. 7A.

When the saturation voltage V3 is applied between electrodes, substantially no difference exists in refractive index between the bulk 38A or 38B and the fine particles 39A or 39B in both oblique and lateral directions in each of the first and second regions 34A and 34B. Thus, high transparency is obtained in both the regions as shown in FIGS. 6B and 7B.

Case 2

Figure 8:
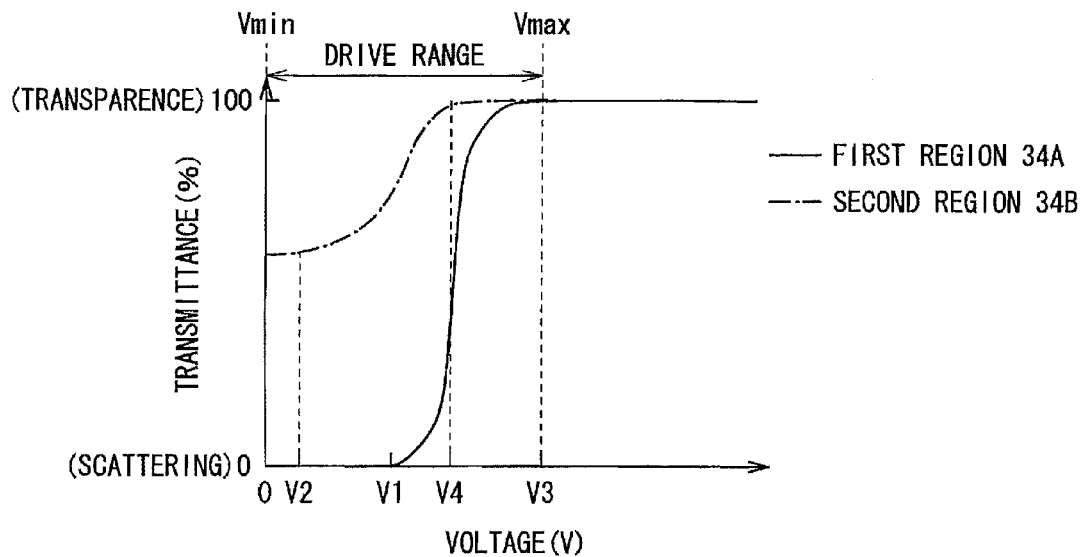
FIG. 8 is a relationship diagram showing another example of the relationship between voltage and transmittance in each of the first and second regions of the light modulator in FIG. 1.

In this case, particle diameter of the fine particles 39B is larger than that of the fine particles 39A as in the case 1. As a result, for example, a drive start voltage V2 of the second region 34B is lower than a drive start voltage V1 of the first region 34A as shown in FIG. 8. FIG. 8 schematically shows a relationship between applied voltage and transmittance in each of the first and second regions 34A and 34B.

Furthermore, in the case 2, the weight ratio W2 is smaller than the weight ratio W1 as in the case 1, but the weight ratio W2 is smaller than that in the case 1. As a result, for example, the drive start voltage V2 is smaller than the drive start voltage V1, and when no voltage is applied between electrodes, transmittance of the second region 34B is high compared with that in the case 1, as shown in FIG. 8. That is, in the case 2, the second region 34B is substantially transparent during no voltage application.

In the case 2, a drive range defined as a range of a lower limit voltage $V_{min}$ to an upper limit voltage $V_{max}$ is, for example, set as 0 (zero) to V3, thereby the second region 34B may be kept to be transparent or substantially transparent while the first region 34A is changed between a transparent state and a scatterable state. The drive range may be a range other than the above, and, for example, may be V2 to V3, or V1 to V3. Hereinafter, an optical characteristic of each region in the case 2 is described.

Figure 9A:
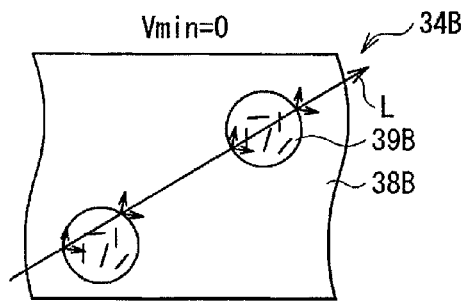
FIGS. 9A and 9B are schematic views for illustrating an example of operation of the second region in FIG. 8.
Figure 9B:
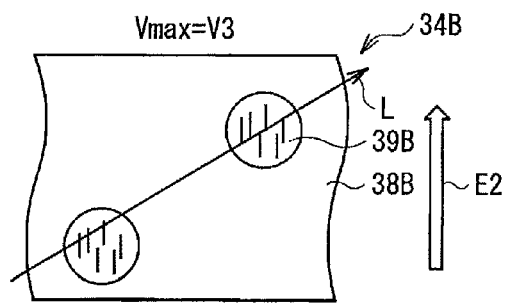
Figure 10A:
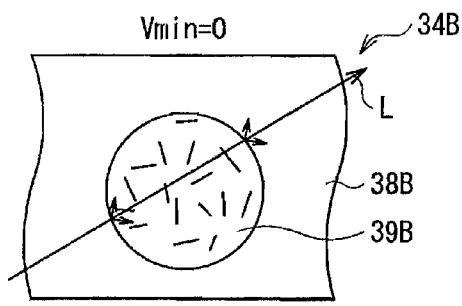
FIGS. 10A and 10B are schematic views for illustrating another example of the operation of the second region in FIG. 8.
Figure 10B:
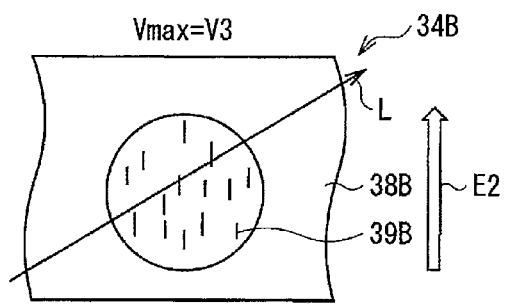

FIGS. 9A and 10A schematically show optical operation of the second region 34B in the case that no voltage is applied between electrodes. In this case, the bulk 38B is optically isotropic, and is not aligned. FIGS. 9B and 10B schematically show optical operation of the second region 34B in the case that the saturation voltage V3 is applied as the upper limit voltage $V_{max}$ between electrodes.

In the case 2, for example, an occupancy rate of the bulk 38B in the second region 34B is large compared with that in the case 1 as shown in FIGS. 9A and 9B, or, for example, particle diameter of the fine particles 39B is extremely large compared with that in the case 1 as shown in FIGS. 10A and 10B.

In the case 2, an internal configuration of the first region 34A is the same as that in the case 1. Therefore, when no voltage is applied between electrodes, optical operation of the first region 34A is the same as optical operation as schematically shown in FIG. 6A. Moreover, when the saturation voltage V3 is applied as the upper limit voltage $V_{max}$ between electrodes, optical operation of the first region 34A is the same as optical operation as schematically shown in FIG. 6B.

When no voltage is applied between electrodes, for example, a liquid crystal in the fine particles 39A or 39B is oriented in a random direction, and thus not aligned as shown in FIGS. 6A and 9A or FIG. 10A. That is, the fine particles 39A or 39B are optically isotropic. In contrast, when the saturation voltage V3 is applied between electrodes, for example, the liquid crystal in the fine particles 39A or 39B is oriented in the same or approximately the same direction as a direction of an electric field E2, and thus aligned in the vertical direction as shown in FIGS. 6B and 9B or FIG. 10B. In such a case, the fine particles 39A or 39B are optically anisotropic. At that time, a light axis of the liquid crystal in the fine particles 39A or 39B is oriented in the vertical direction. The light axis of the liquid crystal in the fine particles 39A or 39B need not be necessarily oriented in the vertical direction, and, for example, may be oriented in a direction intersecting with the vertical direction due to manufacturing errors or the like.

A refractive index of the bulk 38A or 38B is different from a refractive index of the fine particles 39A or 39B when the fine particles are optically isotropic. A refractive index of the bulk 38A is equal to or approximately equal to an extraordinary index of the fine particles 39A or 39B when the fine particles are optically anisotropic.

In the first region 34A, when the drive start voltage V1 is applied between electrodes, a difference in refractive index between the bulk 38A and the fine particles 39A is large in any direction. As a result, the first region 34A has a high light-scattering ability as shown in FIG. 6A. In contrast, in the second region 34B, for example, particle diameter of the fine particles 39B is larger than particle diameter of the fine particles 39A as shown in FIG. 9A or 10A. Furthermore, an occupancy rate of the bulk 38B in the second region 34B is large compared with that in the case 1, or particle diameter of the fine particles 39B is extremely large compared with that in the case 1. Therefore, scattering in the second region 34B is reduced compared with that in the case 1, and transmittance of the second region 34B is thus high compared with that in the case 1. As a result, for example, the second region 34B becomes substantially transparent despite occurrence of slight scattering in the region 34B as shown in FIG. 9A or 10A.

When the saturation voltage V3 is applied between electrodes, substantially no difference exists in refractive index between the bulk 38A or 38B and the fine particles 39A or 39B in both oblique and lateral directions in each of the first and second regions 34A and 34B. Thus, high transparency is obtained in both the regions as shown in FIGS. 9B and 10B.

Case 3

Figure 11:
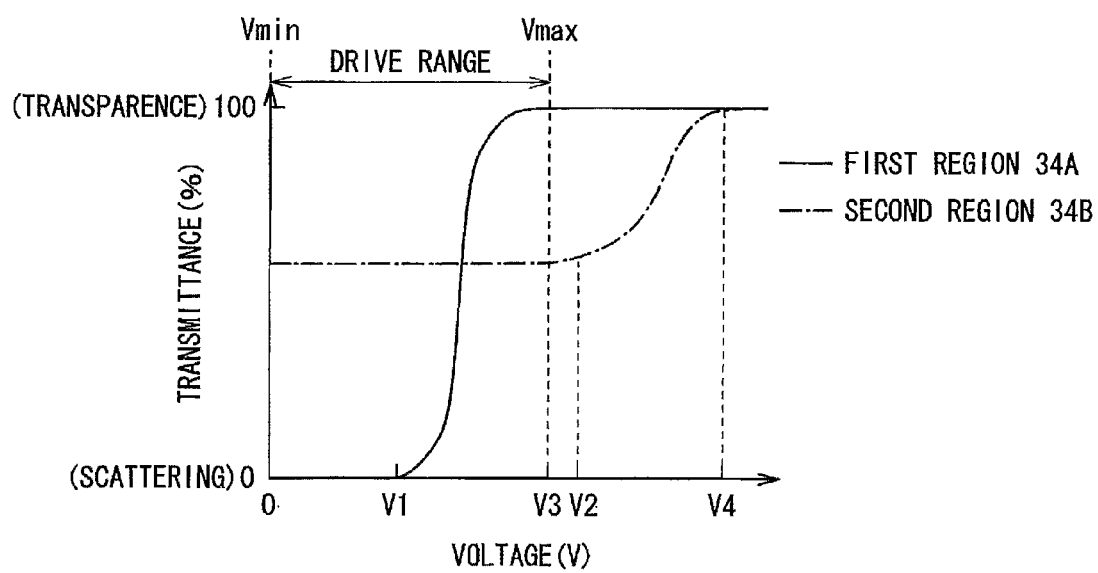
FIG. 11 is a relationship diagram showing still another example of the relationship between voltage and transmittance in each of the first and second regions of the light modulator in FIG. 1.

In this case, particle diameter of the fine particles 39B is smaller than that of the fine particles 39A unlike in the case 1 or 2, so that a liquid crystal in the fine particles 39B hardly moves compared with a liquid crystal in the fine particles 39A. As a result, for example, a drive start voltage V2 of the second region 34B is larger than a drive start voltage V1 of the first region 34A as shown in FIG. 11. FIG. 11 schematically shows a relationship between applied voltage and transmittance in each of the first and second regions 34A and 34B.

In the case 3, a weight ratio W2 is smaller than the weight ratio W1 as in the case 2, and the weight ratio W2 is larger than that in the case 1. As a result, for example, the drive start voltage V2 is larger than the drive start voltage V1, and when no voltage is applied between electrodes, transmittance of the second region 34B is high compared with that in the case 1 as shown in FIG. 11. That is, in the case 3, the second region 34B is substantially transparent during no voltage application.

In the case, a drive range defined as a range of a lower limit voltage $V_{min}$ to an upper limit voltage $V_{max}$ is, for example, set as 0 (zero) to V3, thereby the second region 34B may be kept to be transparent or substantially transparent while the first region 34A is changed between a transparent state and a scatterable state. The drive range may be a range other than the above, and, for example, may be V1 to V3. Hereinafter, an optical characteristic of each region in the case 3 is described.

Figure 12A:
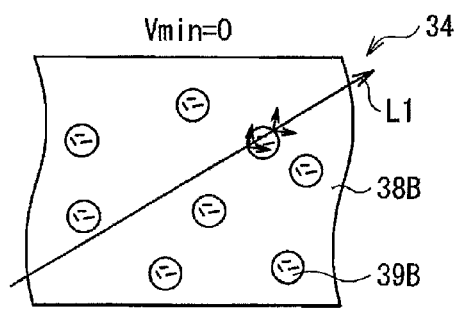
FIGS. 12A and 12B are schematic views for illustrating an example of operation of the second region in FIG. 11.
Figure 12B:
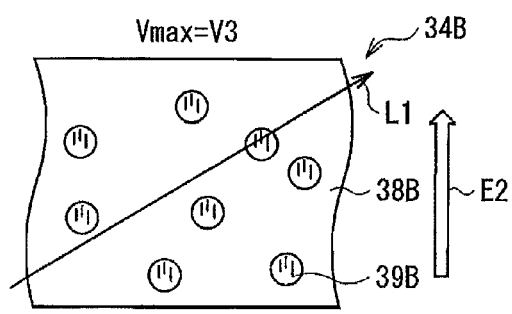

FIG. 12A schematically shows optical operation of the second region 34B in the case that no voltage is applied between electrodes. In this case, the bulk 38B is optically isotropic, and thus not aligned. FIG. 12B schematically shows optical operation of the second region 34B in the case that a saturation voltage V3 is applied as the upper limit voltage $V_{max}$ between electrodes.

In the case 3, for example, an occupancy rate of the bulk 38B in the second region 34B is large compared with that in the case 1, and particle diameter of the fine particles 39B is small compared with that in the case 1, as shown in FIGS. 12A and 12B.

In the case 3, an internal configuration of the first region 34A is the same as that in the case 1. Therefore, when no voltage is applied between electrodes, optical operation of the first region 34A is the same as optical operation as schematically shown in FIG. 6A. Moreover, when the saturation voltage V3 is applied as the upper limit voltage $V_{max}$ between electrodes, optical operation of the first region 34A is the same as optical operation as schematically shown in FIG. 6B.

When no voltage is applied between electrodes, for example, a liquid crystal in the fine particles 39A or 39B is oriented in a random direction, and thus not aligned as shown in FIGS. 6A and 12A. That is, the fine particles 39A or 39B are optically isotropic. In contrast, when the saturation voltage V3 is applied between electrodes, for example, the liquid crystal in the fine particles 39A or 39B is oriented in the same or approximately the same direction as a direction of an electric field E2, and thus aligned in the vertical direction, as shown in FIGS. 6B and 12B. That is, the fine particles 39A or 39B are optically anisotropic. In such a case, a light axis of the liquid crystal in the fine particles 39A or 39B is oriented in the vertical direction. The light axis of the liquid crystal in the fine particles 39A or 39B need not be necessarily oriented in the vertical direction, and, for example, may be oriented in a direction intersecting with the vertical direction due to manufacturing errors or the like.

A refractive index of the bulk 38A or 38B is different from a refractive index of the fine particles 39A or 39B when the fine particles are optically isotropic. A refractive index of the bulk 38A is equal to or approximately equal to an extraordinary index of the fine particles 39A or 39B when the fine particles are optically anisotropic.

In the first region 34A, when the drive start voltage V1 is applied between electrodes, a difference in refractive index between the bulk 38A and the fine particles 39A is large in any direction. As a result, the first region 34A has a high light-scattering ability as shown in FIG. 6A. In contrast, in the second region 34B, for example, an occupancy rate of the bulk 38B in the second region 34B is large compared with that in the case 1, and particle diameter of the fine particles 39B is small compared with that in the case 1 as shown in FIG. 12A. Therefore, scattering in the second region 34B is reduced compared with that in the case 1, and transmittance of the second region 34B is thus increased compared with that in the case 1. As a result, for example, the second region 34B becomes substantially transparent despite occurrence of slight scattering in the region 34B as shown in FIG. 12A.

When the saturation voltage V3 is applied between electrodes, substantially no difference exists in refractive index between the bulk 38A or 38B and the fine particles 39A or 39B in both oblique and lateral directions in each of the first and second regions 34A and 34B. Thus, high transparency is obtained in both the regions as shown in FIG. 12B.

In any of cases 1, 2 and 3, light L (light in an oblique direction), which is emitted from the light source 20, and propagated through the light guide plate 10, is, for example, subjected to the following operation by the light guide plate 10, the light modulator 30, and the reflector plate 40, and then outputted to the outside. Specifically, the light L is transmitted through a region (hereinafter, called transparent region 30A), which becomes transparent by applying the saturation voltage V3 between electrodes, then reflected (for example, perfectly reflected) by an interface between the transparent region 30A and air, and then transmitted through the transparent region 30A again and returned into the light guide plate 10. The light returned into the light guide plate 10 is reflected (for example, perfectly reflected) by a top of the light guide plate 10, and propagated through the light guide plate 10. Therefore, luminance of the transparent region 30A is extremely low compared with a case where the light modulator 30 is not provided (dashed line in FIG. 13B). The light L is scattered within a region (hereinafter, called scattering region 30B), which has light-scattering ability by applying the drive start voltage V1 or applying no voltage between electrodes. A part of the scattered light is transmitted through the light guide plate 10, and then outputted to the outside. Another part of the scattered light is reflected by the reflector plate 40, then scattered in the scattering region 30B again, or transmitted through the scattering region 30B, and finally outputted to the outside. Consequently, luminance of the scattering region 30B is extremely high compared with the case where the light modulator 30 is not provided (dashed line in FIG. 13B), in addition, partial white-display luminance (luminance raise) is increased by a level corresponding to decrease in luminance of the transparent region 30A.

A refractive index difference (ordinary index minus extraordinary index) of the fine particles 39A is preferably large to the utmost, and is preferably 0.05 or more, more preferably 0.1 or more, and still more preferably 0.15 or more. This is because when a difference in refractive index of the fine particles 39A is large, the light modulator layer 34 has a high light-scattering ability so that a light guide condition may be easily broken, consequently light is easily extracted from the light guide plate 10.

For example, the drive circuit 50 controls a voltage applied to the pair of electrodes (the lower electrode 32 and the upper electrode 36) such that a light axis of the fine particles 39A or 39B is perpendicular or approximately perpendicular to a surface of the transparent substrate 31 or 37 in one light modulator cell 30A, and a light axis of the fine particles 39A or 39B shallowly intersects with the surface of the transparent substrate 31 or 37 in the other light modulator cell 30B.

Hereinafter, a method of manufacturing the backlight 1 of the embodiment is described with reference to FIGS. 14A to 14C to FIGS. 16A to 16C.

Figure 14A:
FIGS. 14A to 14C are section views for illustrating manufacturing steps of the backlight of FIG. 1.
Figure 14B:
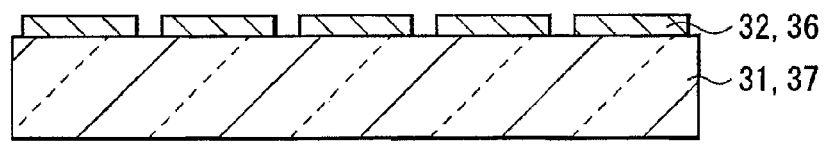

First, a transparent conductive film 32A or 36A including ITO is formed on the transparent substrate 31 or 37 including a glass substrate or a plastic film substrate (FIG. 14A). Next, a resist layer is formed over the whole surface, and then an electrode pattern (a lower electrode 32 pattern or an upper electrode 36 pattern) is formed in the resist layer by patterning (FIG. 14B).

A photolithography method or a laser aberration method is preferably used for the patterning. The electrode pattern is determined depending on a drive method and dividing number of partial drive. For example, when a 42 inch display is divided into 12*6, a pattern having electrode width of about 80 mm is formed, and an inter-electrode slit portion is thinned to the utmost. However, since an excessively thin slit portion is not useful in the light of a gradation characteristic described later, specifically, a slit of about 10 to 500 μm is preferably used. Alternatively, the electrode pattern may be formed by printing ITO nanoparticles in a pattern, and then baking the nanoparticles.

Figure 14C:
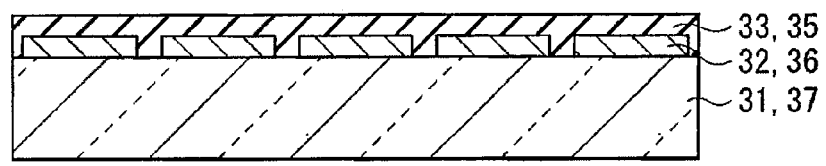

Next, an alignment film 33 or 35 is coated over the whole surface, and then the alignment film is dried and baked (FIG. 14C). When a polyimide series material is used for the alignment film 33 or 35, NMP (N-methyl-2-pyrolidon) is often used as a solvent. In such a case, temperature of about 200° C. is necessary for the drying and baking in the air. In this case, when a plastic substrate is used as the transparent substrate 31 or 37, the alignment film 33 or 35 may be dried and baked in a vacuum at 100° C.

Figure 15A:
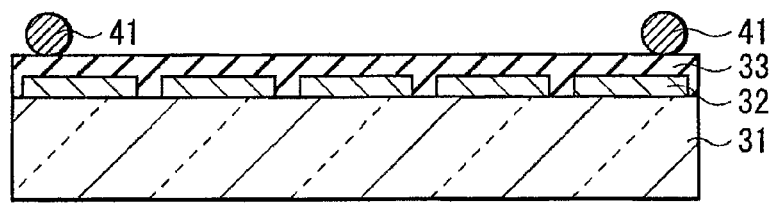
FIGS. 15A to 15C are section views for illustrating manufacturing steps subsequent to FIGS. 14A to 14C.

Next, spacers 41 for forming a cell gap are dispersed on the alignment film 33 by a dry or wet process (FIG. 15A). When the light modulator cell 30A is formed by a vacuum bonding method, spacers 38 may be mixed in a mixture to be dropped. Columnar spacers may be formed by a photolithography process in place of the spacers 38.

Figure 15B:
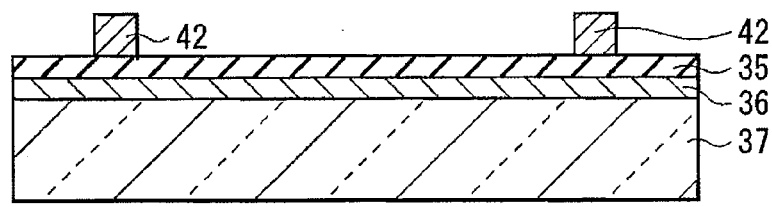

Next, a sealant pattern 42 is coated on the alignment film 35, for example, in a frame pattern for both bonding and prevention of leakage of a liquid crystal (FIG. 15B). The sealant pattern 42 may be formed by a dispenser method or a screen printing method.

Hereinafter, the vacuum bonding method (One Drop Fill (ODF) method) is described. However, the light modulator cell 30A may be formed even by a vacuum injection method or the like.

Figure 15C:
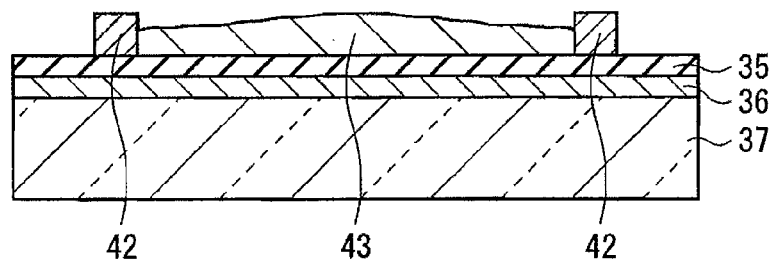

First, a mixture 43 of a liquid crystal material and a polymerizable material, which corresponds to volume determined from a cell gap, cell area or the like, is uniformly dropped in a plane (FIG. 15C). A linear-guide precision dispenser is preferably used for dropping the mixture 43. However, a die coater may be used with the sealant pattern 42 as a bank.

The aforementioned materials may be used as the liquid crystal material and the polymerizable material respectively, and a weight ratio between the liquid crystal material and the polymerizable material is set to the aforementioned value. While a drive voltage may be reduced by increasing a ratio of the liquid crystal, when the liquid crystal is excessively increased, whiteness is reduced during voltage application, or a transparent state is hardly recovered when voltage application is finished because response speed is reduced.

The mixture 43 is added with a polymerization initiator in addition to the liquid crystal material and the polymerizable material. A monomer percent of a polymerization initiator to be added is adjusted within a range of 0.1 to 10 wt % depending on an ultraviolet wavelength to be used. The mixture 43 may be further added with a polymerization inhibitor, a plasticizer, or a viscosity modifier if necessary. When the polymerizable material is a solid or a gel, a base, a syringe, and a substrate are preferably heated.

The transparent substrates 31 and 37 are disposed in a vacuum bonding machine (not shown), then the inside of the machine is evacuated, and the substrates are bonded (FIG. 16A). Then, the bonded substrates are released to the air, and a cell gap is made even by uniform pressurization at atmospheric pressure. While the cell gap may be appropriately selected based on a relationship between white luminance (whiteness) and drive voltage, the cell gap is 5 to 40 μm, preferably 6 to 20 μm, and more preferably 7 to 10 μm.

After bonding, alignment processing is preferably performed if necessary (not shown). When a bonded cell is inserted between a crossed nicols polarizer, if light leakage occurs, the cell is heated for a certain time, or left at room temperature to induce alignment.

Next, a mask M, the open area ratio of which varies depending on a distance from a region where the light source 20 is to be disposed, is disposed on the transparent substrate 37 (FIG. 16B). The open area ratio of the mask M is increased with increase in distance from the region where the light source 20 is to be disposed. Next, light $L_3$ (for example, ultraviolet rays) is strongly irradiated to the polymerizable material in the mixture 43 via the mask M (FIG. 16B). Thus, the polymerizable material is polymerized into a polymer in areas strongly irradiated with light, specifically, in areas of the mixture 43 corresponding to openings (not shown) formed in the mask M, and besides, the liquid crystal material and the polymerizable material are phase-separated from each other. As a result, the first region 34A (not shown) is formed in the areas strongly irradiated with light. An occupancy rate of the first region 34A in the mixture 43 is increased with increase in distance from the region where the light source 20 is to be disposed.

Polymerization and phase separation concurrently proceed in the process where the liquid crystal material and the polymerizable material are irradiated with ultraviolet rays. Since polymerization speed is faster than phase separation speed of a liquid crystal with increase in ultraviolet illuminance, liquid crystal droplets with small diameter tend to be formed. Since the mixture 43 is of a normally white type, as illuminance increases, scattering ability of the mixture tends to be increased, and a drive start voltage tends to be increased. Therefore, the above light irradiation process increases scattering ability of the first region 34A, and decreases scattering ability of other regions, leading to improvement in transparency.

Next, light is weakly irradiated to areas where the second region 34B is to be formed. For example, weak light $L_4$ is irradiated to the mixture 43 as a whole without using the mask M as shown in FIG. 16C. Thus, the polymerizable material is polymerized into a polymer, and besides, the liquid crystal material and the polymerizable material are phase-separated from each other in the areas where the second region 34B is to be formed. As a result, the second region 34B (not shown) is formed in areas other than the first region 34A of the mixture 43.

In this way, in the embodiment, the first region 34A and the second region 34B are formed in accordance with intensity of irradiated light and a mask pattern. Moreover, the mask M varies in open area ratio depending on a distance from the region where the light source 20 is to be disposed. Therefore, an occupancy rate of the first region 34A in the mixture 43 may be varied depending on the distance from the region where the light source 20 is to be disposed. In this way, in the embodiment, each of the first region 34A and the second region 34B may be formed in the mixture 43 with an occupancy rate depending on the distance from the region where the light source 20 is to be disposed by a simple method of light irradiation using the mask M. In this way, the light modulator 30 is manufactured.

In the manufacturing method, a mask, the open area ratio of which varies with increase in distance from the region where the light source 20 is to be disposed, is used as the mask M. However, another mask may be used instead of the mask having transmissive portions and shading portions discontinuous to each other. For example, a gray mask may be used as the mask M, the gray mask having a transmittance being gradually increased with increase in distance from the region where the light source 20 is to be disposed. In the manufacturing steps, cell temperature is preferably not changed during ultraviolet irradiation. In addition, the cell temperature is preferably kept high during the irradiation. In such a case, transparency of the second region 34B may be increased. Moreover, an infrared cut filter is preferably used, or UV-LED is preferably used for the light source. Moreover, since ultraviolet rays affect a structure of a composite material, illuminance of ultraviolet rays is preferably appropriately adjusted based on a liquid crystal material or a monomer material to be used, or a composition of the materials.

When droplet diameter of a liquid crystal in the fine particles 39A is desired to be different from that in the fine particles 39B, a process exemplified below is preferably used. For example, a seal pattern is drawn, then materials, which are different in weight ratio between a liquid crystal and a polymerizable material, may be separately coated (patterned) on areas corresponding to the first region 34A and to the second region 34B by using a dispenser method, a screen printing method, an inkjet method or the like. Alternatively, a process may be used, where only the polymerizable material (for example, acrylic ultraviolet curing resin) is coated on an area corresponding to the second region 34B, then a material to be used is dropped onto the first region 34A. In the case of using the latter process, ultraviolet rays are collectively irradiated to the whole surface with the same irradiation, so that the first region 34A and the second region 34B, the regions being different in transparency from each other, may be formed. Moreover, an area irradiated with high ultraviolet illuminance and an area irradiated with low ultraviolet illuminance may be formed by using a mask as described before.

Then, the light modulator 30 is bonded to the light guide plate 10. While the light modulator may be bonded by either of sticking and adhesion, the light modulator is preferably bonded by using a material having a refractive index being close to a refractive index of the light guide plate 10 and to a refractive index of a substrate material of the light modulator 30 to the utmost. Finally, lead lines (not shown) are attached to the lower and upper electrodes 32 and 36 respectively. In this way, the backlight 1 of the embodiment is manufactured.

Description has been made on such a process that the light modulator 30 is formed, and finally the light modulator 30 is bonded to the light guide plate 10. However, a transparent substrate 37 having the alignment film 35 formed thereon may be beforehand bonded to a surface of the light guide plate 10 to form the backlight 1. The backlight 1 may be formed by either of a sheet-feed method and a roll-to-roll method.

Next, operation and effects of the backlight 1 of the embodiment are described.

In the backlight 1 of the embodiment, the light modulator 30 adhered to the light guide plate 10 includes the first region 34A being changed between the transparent state and the scatterable state depending on intensity of an electric field, and the second region 34B being more transparent than the first region 34A in a scatterable state at an electric field having certain intensity, the electric field being applied when the first region 34A is changed between the states. Thus, light from the light source 20 is incident to the light guide plate 10, and perfectly reflected or reflected with a high reflectance by a top of the light guide plate 10, or by a bottom of a region (transparent region 30A), which becomes transparent by controlling an electric field, of the light modulator layer 34, and propagated through the light guide plate 10 and the light modulator 30 (refer to FIG. 13). This decreases luminance of an area corresponding to the transparent region 30A in a light emitting area of the backlight 1. In contrast, the light propagated through the light guide plate 10 and the light modulator 30 is scattered by a region (scattering region 30B), which has light-scattering ability by controlling an electric field, of the light modulator layer 34. A part of the scattered light, which is transmitted through a bottom of the scattering region 30B, is reflected by the reflector plate 40, and returned to the light guide plate 10, and then outputted from a top of the backlight 1. Another part of the scattered light, which is directed to a top of the scattering region 30B, is transmitted through the light guide plate 10, and then outputted from the top of the backlight 1.

In this way, in the embodiment, light is hardly outputted from the top of the transparent region 30A, and largely outputted from the top of the scattering region 30B. This increases luminance of an area corresponding to the scattering region 30B in the light emitting area of the backlight 1. As a result, a modulation ratio in a front direction is increased.

Figure 13A:
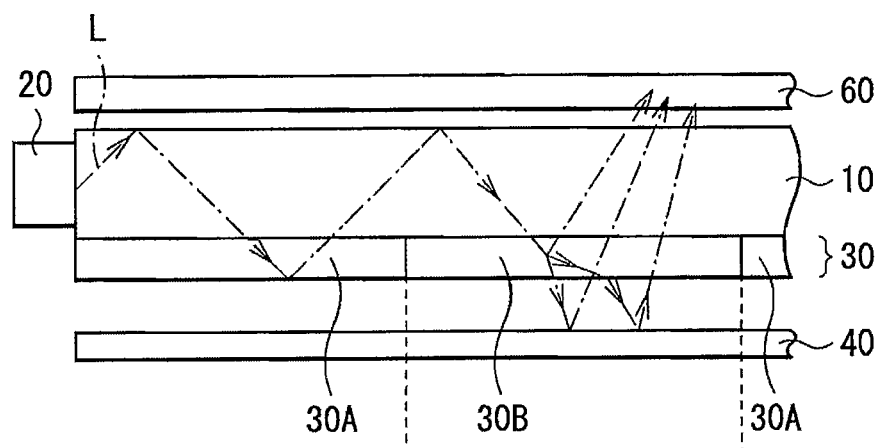
FIGS. 13A and 13B are schematic views for illustrating operation of the backlight of FIG. 1.
Figure 13B:
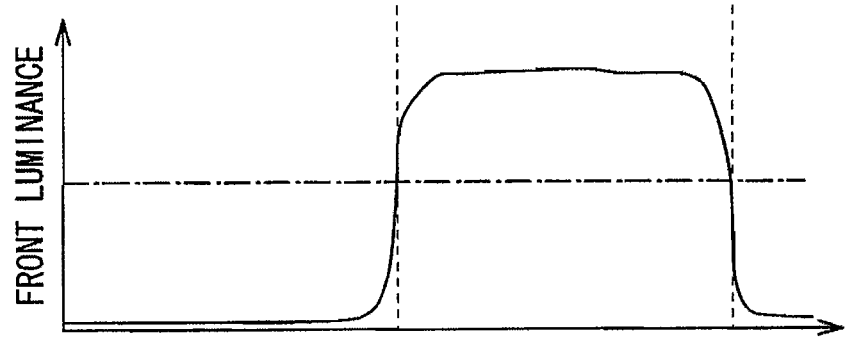

In the embodiment, for example, luminance of the transparent region 30A (luminance of black display) is low compared with a case where the light modulator 30 is not provided (dashed line in FIG. 13B) as shown in FIGS. 13A and 13B. On the other hand, luminance of the scattering region 30B is high compared with the case where the light modulator 30 is not provided (dashed line in FIG. 13B), in addition, partial white-display luminance (luminance raise) is increased by a level corresponding to decrease in luminance of the transparent region 30A.

The luminance raise is a technique of increasing luminance in a case where white display is partially performed compared with a case where white display is wholly performed. The technique is generally used in CRT or PDP. However, in a liquid crystal display, since a backlight uniformly emits light all over the screen regardless of an image, luminance may not be partially increased. In the case of using an LED backlight where a plurality of LED are two-dimensionally arranged, the LED may be partially turned off. However, in such a case, since diffused light from a dark area where the LED are turned off is lost, luminance is reduced compared with a case where all LED are turned on. Luminance may be increased by increasing current flowing to LED being partially turned on. However, in such a case, a large current flows in an extremely short time, leading to a difficulty in circuit load or reliability.

In contrast, in the embodiment, when a refractive index of the bulks 38A or 38B is equal to or approximately equal to an ordinary index of the fine particles 39A or 39B, scattering in a front direction is suppressed, so that leakage light from the light guide plate is reduced in a dark state. Thus, since light is guided from a partially dark portion to a partially bright portion, luminance raise may be achieved without increasing input power to the backlight 1.

In the embodiment, an occupancy rate of the first region 34A in the light modulator layer 34 is increased with increase in distance from the light source 20. Thus, luminance of a light source 20 side of a light emitting area of the backlight 1 may be controlled low compared with a case where the light modulator 30 is not provided, and luminance on a side opposite to the light source 20 side of the light emitting area may be increased compared with the case where the light modulator 30 is not provided. As a result, luminance may be made uniform in a plane not only in a case where the whole light emitting area of the backlight 1 is darkened, for example, as shown in FIG. 17B, but also in a case where the whole light emitting area of the backlight 1 is lightened, for example, as shown in FIG. 17C. Consequently, for example, when white display is performed in an area $\alpha_1$ near the light source 20 and in an area $\alpha_2$ away from the light source 20, white luminance may be equalized between both the areas as shown in FIG. 17D. Moreover, for example, when black display is performed in an area $\beta_1$ near the light source 20 compared with the area $\alpha_1$, in an area $\beta_2$ between the area $\alpha_1$ and the area $\alpha_2$, and in area $\beta_3$ away from the light source 20 compared with the area $\alpha_2$, black luminance may be equalized between the areas as shown in FIG. 17D.

Modification

Figure 18:
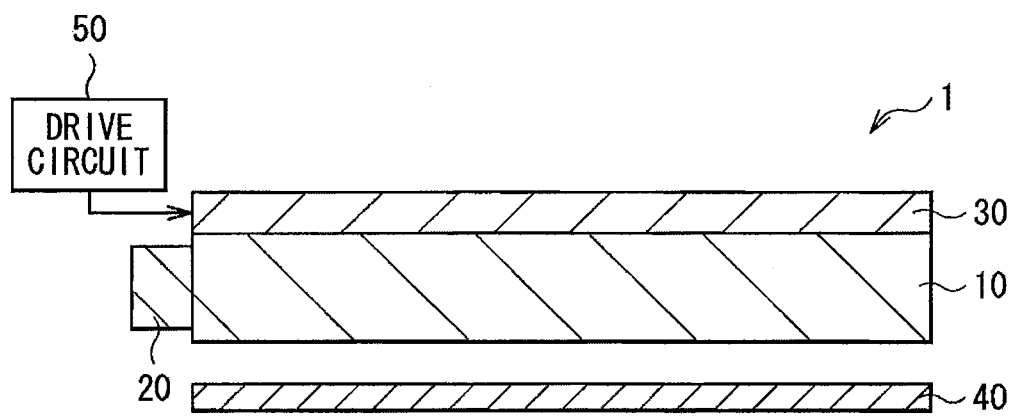
FIG. 18 is a section view showing still another example of the configuration of the backlight of FIG. 1.
Figure 19:
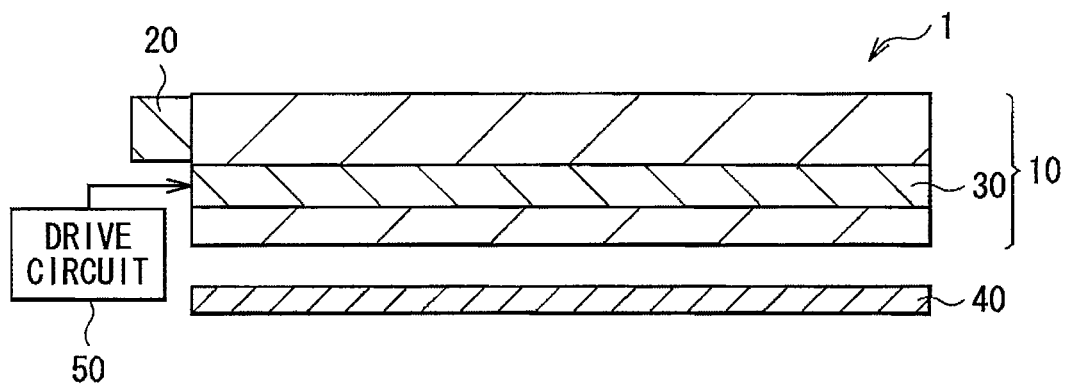
FIG. 19 is a section view showing still another example of the configuration of the backlight of FIG. 1.

In the embodiment, the light modulator 30 is adherently bonded to the back (bottom) of the light guide plate 10 without inserting an air layer. However, for example, the light modulator 30 may be adherently bonded to the top of the light guide plate 10 without inserting an air layer as shown in FIG. 18. Alternatively, for example, the light modulator 30 may be provided within the light guide plate 10 as shown in FIG. 19.

However, even in this case, the light modulator 30 needs to be adherently bonded to the light guide plate 10 without inserting an air layer.

Figure 20:
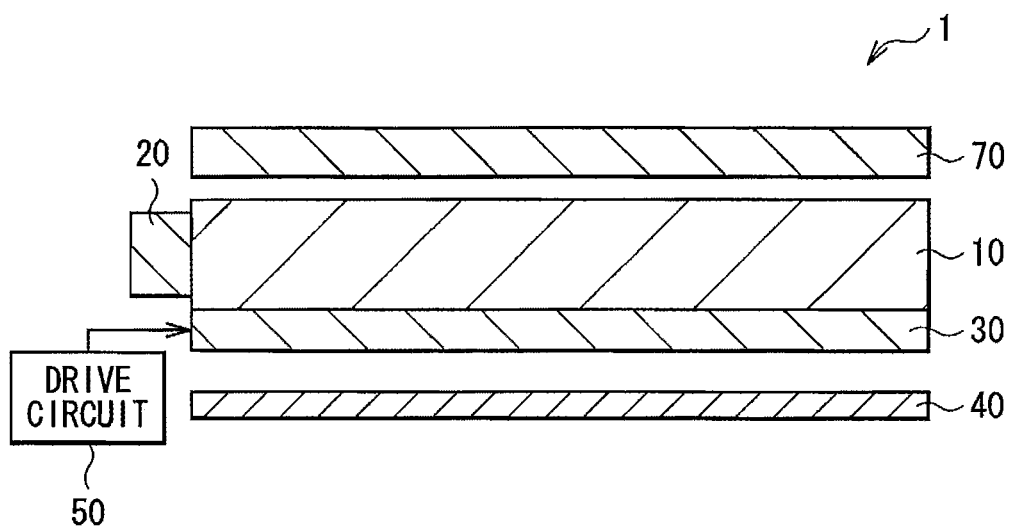
FIG. 20 is a section view showing still another example of the configuration of the backlight of FIG. 1.

While a component is not particularly provided on the light guide plate 10 in the embodiment, for example, an optical sheet 70 (for example, a diffuser plate, a diffuser sheet, a lens film, or a polarization separation sheet) may be provided on the light guide plate 10 as shown in FIG. 20.

Second Embodiment

Figure 21A:
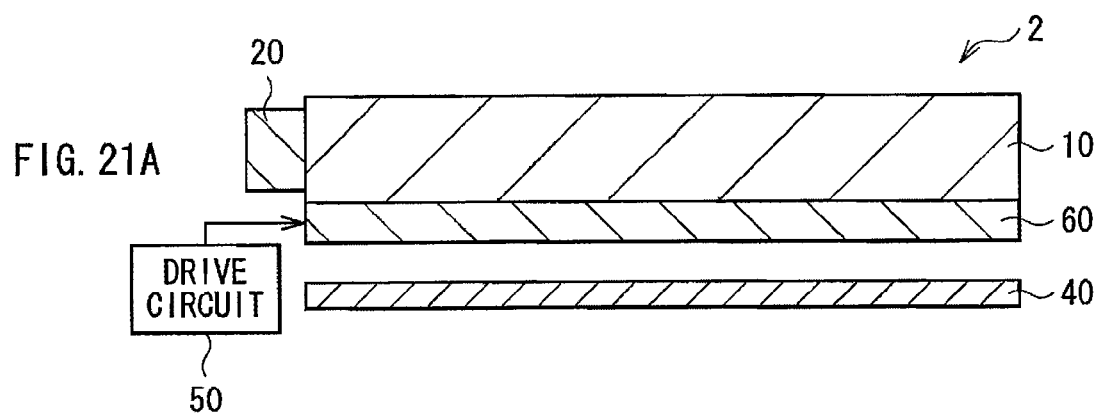
FIGS. 21A and 21B are section views showing an example of a configuration of a backlight according to a second embodiment.
Figure 21B:
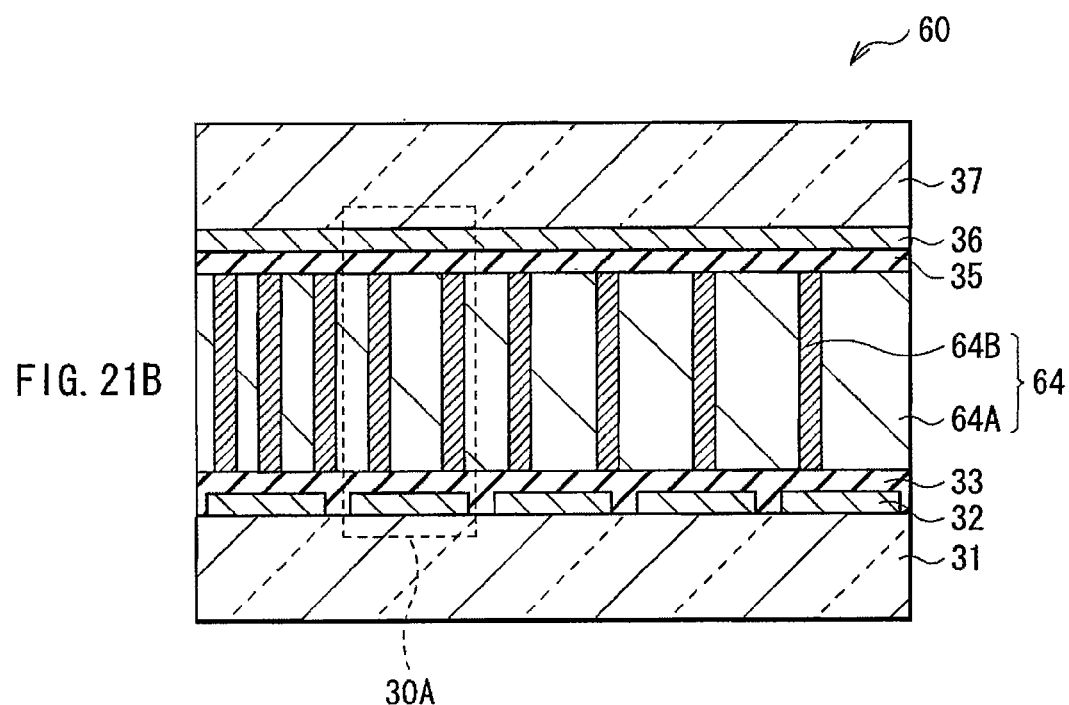

FIG. 21A shows an example of a sectional configuration of a backlight 2 (illumination device) according to a second embodiment of the invention. FIG. 21B shows an example of a sectional configuration of a light modulator 60 (described later) incorporated in the backlight 2 of FIG. 21A. FIGS. 21A and 21B schematically show the examples, and therefore a dimension or shape is not limited to be the same as an actual dimension or shape in the figures. The backlight 2, for example, illuminates a liquid crystal display panel from a back of the panel as the backlight 1 of the first embodiment and the modification, but different from the configuration of the backlight 1 in that the light modulator 60 is provided in place of the light modulator 30. Thus, hereinafter, different points from the first embodiment and the modification are mainly described, and description of points in common with the first embodiment and the modification is appropriately omitted.

The light modulator 60 is, for example, formed by disposing a transparent substrate 31, a lower electrode 32, an alignment film 33, a light modulator layer 64, an alignment film 35, an upper electrode 36 and a transparent substrate 37 in order from a side of the reflector plate 40 as shown in FIG. 21B.

The light modulator layer 64 has, for example, two regions (first region 64A and second region 64B) different in optical characteristic at a certain electric-field intensity as shown in FIG. 21B. The first region 64A and the second region 64B have, for example, a columnar shape extending in a stacking direction of the light modulator 60 respectively. The first region 64A is formed filling the periphery of the second region 64B, and the second region 64B is dispersed within the first region 64A as viewed from a top of the light modulator layer 64.

The second region 64B has, for example, a cylindrical shape, an elliptical cylinder shape, or a prismatic shape. For example, diameter of the second region 64B is constant regardless of a distance from the light source 20, and for example, about several micrometers to several millimeters. The diameter of the second region 64B need not be necessarily constant, and, for example, may be decreased with increase in distance from the light source 20. When the diameter of the second region 64B is constant, an occupancy rate (density) of the second region 64B in the light modulator layer 64 is, for example, decreased with increase in distance from the light source 20. When the diameter of the second region 64B is decreased with increase in distance from the light source 20, number of the second region 64B per area is set such that an occupancy rate (density) of the region 64B in the light modulator layer 64 is decreased with increase in distance from the light source 20. Consequently, in each case, an occupancy rate of the first region 64A in the light modulator layer 64 is constant in a thickness direction, and increased with increase in distance from the light source 20 in an in-plane direction.

The first region 64A and the second region 64B need not necessarily have a columnar shape. For example, when the first region 64A has a bulk shape, and the second region 64B has a block shape, the light modulator layer 64 may be configured such that the second region 64B is dispersed in the first region 64A not only in an in-plane direction but also in a thickness direction. When the second region 64B is uniformly dispersed in the thickness direction, and dispersed more thinly with increase in distance from the light source 20 in an in-plane direction, an occupancy rate of the first region 64A in the light modulator layer 64 is constant in a thickness direction, and increased with increase in distance from the light source 20 in an in-plane direction. When the second region 64B is nonuniformly dispersed in the thickness direction, and dispersed more thinly with increase in distance from the light source 20 in an in-plane direction, an occupancy rate of the first region 64A in the light modulator layer 64 varies in a thickness direction, and is increased with increase in distance from the light source 20 in an in-plane direction.

The first region 64A includes, for example, a bulk 68A (third region) and fine particles 69A (fourth region). The second region 64B includes, for example, a bulk 68B (fifth region) and fine particles 69B (sixth region). The bulk 68A is different in response speed to an electric field from the fine particles 69A. The bulk 68A or 68B has, for example, a streaky or porous structure nonrespondent to an electric field, or has a rodlike structure having a response speed lower than that of the fine particles 69A or 69B. The bulk 68A or 68B is, for example, formed by polymerizing a material having an aligning property and a polymerizing property (for example, monomer), which is aligned along an alignment direction of the fine particles 69A or 69B or an alignment direction of the bulk 68A or 68B, by at least one of heat and light. In contrast, the fine particles 69A or 69B, for example, mainly include a liquid crystal material, and have a sufficiently fast response speed compared with response speed of the bulk 68A or 68B.

While the monomer having aligning and polymerizing properties may be a material that is optically anisotropic, and may be combined with a liquid crystal, the monomer is preferably a low molecular monomer to be cured by ultraviolet rays in the embodiment. Since it is preferable that optically anisotropic directions of the liquid crystal corresponds to that of a polymerized product of the low molecular monomer (high-polymer material) during no voltage application, the liquid crystal and the low molecular monomer are preferably aligned in the same direction before ultraviolet curing. When a liquid crystal is used for the fine particles 69A, in the case that the liquid crystal includes rodlike molecules, even a monomer material to be used preferably has a rodlike shape. From the above, a material having both of a polymerizing property and a liquid-crystal property is preferably used as the monomer material, and, for example, the material preferably has at least one functional group selected from groups including an acryloyloxy group, a methacryloyloxy group, a vinyl ether group, and an epoxy group as a polymerizable functional group. The functional groups may be polymerized by irradiating ultraviolet rays, infrared rays or an electron beam, or by heating. A liquid crystal material having a multifunctional group may be added to suppress reduction in alignment during ultraviolet irradiation.

A weight ratio W3 between the fine particles 69A and the bulk 68A (weight of the fine particles 69A/weight of the bulk 68A) is different from a weight ratio W4 between the fine particles 69B and the bulk 68B (weight of the fine particles 69B/weight of the bulk 68B). Specifically, the weight ratio W4 is smaller than the weight ratio W3. The weight ratio W3 is, for example, 95/5 to 65/35, and the weight ratio W4 is, for example, 5/95 to 35/65. When the weight ratio W4 is within the exemplified range, the second region 64B may act as spacers for keeping a cell gap.

In the embodiment, both the first and second regions 64A and 64B are configured such that an optical axis of each of the fine particles 69A and 69B, for example, becomes perpendicular to a surface parallel to a surface of each of the transparent substrates 31 and 37, or becomes parallel to the surface. Thus, each of the first and second regions 64A and 64B may be changed between a transparent state and a scatterable state as described later. However, voltage for changing the first region 64A between the transparent state and the scatterable state and voltage for changing the second region 64B between the states are different from each other depending on a magnitude relationship between the weight ratios W3 and W4.

Hereinafter, an optical characteristic of each of the first and second regions 64A and 64B is described in detail while being classified into three cases. The classification is made focusing on three factors of (1) size of particle diameter of the fine particles 69B, (2) magnitude relationship between the weight ratios W3 and W4, and (3) an occupancy rate of the fine particles 69B in the second region 64B.

Case 1

Figure 22:
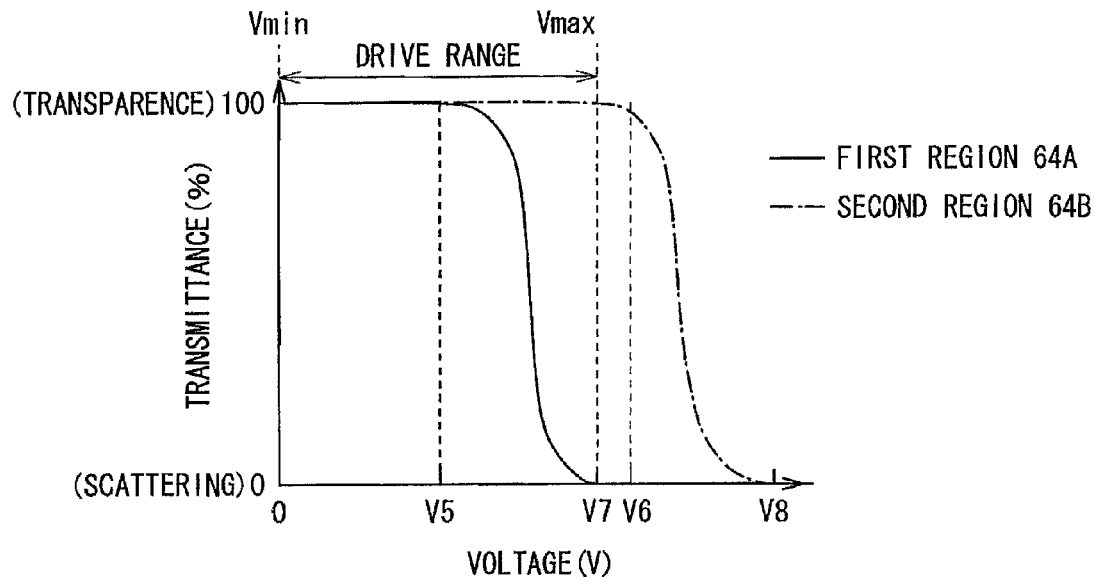
FIG. 22 is a relationship diagram showing an example of a relationship between voltage and transmittance in each of first and second regions of a light modulator in FIG. 21.

In this case, particle diameter of the fine particles 69B is smaller than that of the fine particles 69A, so that a liquid crystal in the fine particles 69B hardly moves compared with a liquid crystal in the fine particles 69A. As a result, for example, a drive start voltage V6 of the second region 64B is higher than a drive start voltage V5 of the first region 64A, and a saturation voltage V8 of the second region 64B is larger than a saturation voltage V7 of the first region 64A, as shown in FIG. 22. FIG. 22 schematically shows a relationship between applied voltage and transmittance in each of the first and second regions 64A and 64B.

In the case 1, particle diameter of the fine particles 69B is smaller than that of the fine particles 69A, and besides, the weight ratio W4 is smaller than the weight ratio W3. Therefore, the second region 64B has a low light-scattering ability during voltage application. As a result, as shown in FIG. 22, when the saturation voltage V7 is applied between electrodes, transmittance of the second region 64B is somewhat high, and the second region 64B is thus substantially transparent. In the case 1, a drive range defined as a range of a lower limit voltage $V_{min}$ to an upper limit voltage $V_{max}$ is, for example, set as 0 (zero) to V7, thereby the second region 64B may be kept to be transparent or substantially transparent while the first region 64A is changed between a transparent state and a scatterable state. The drive range may be a range other than the above, and, for example, may be 0 (zero) to V6, V5 to V7, or V5 to V6. Hereinafter, the optical characteristic of each region in the case 1 is described.

Figure 23A:
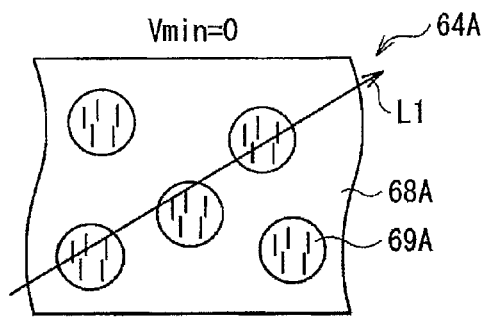
FIGS. 23A and 23B are schematic views for illustrating an example of operation of the first region in FIG. 22.
Figure 23B:
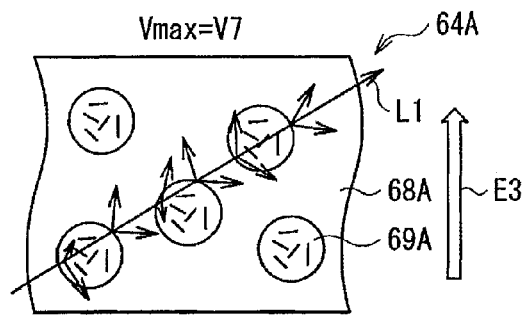
Figure 24A:
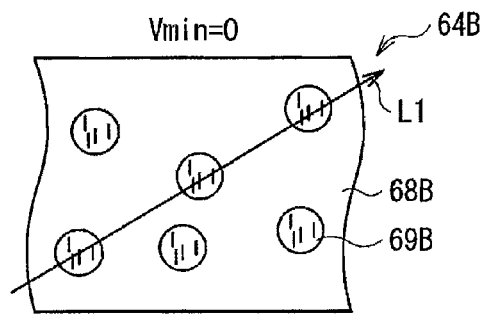
FIGS. 24A and 24B are schematic views for illustrating an example of operation of the second region in FIG. 22.
Figure 24B:
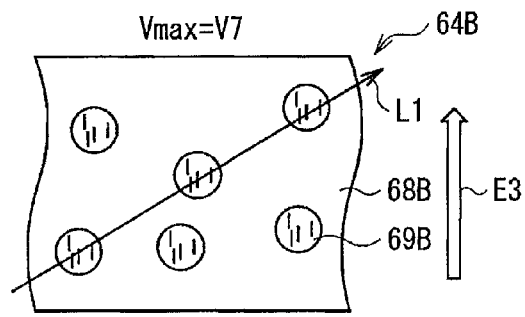

FIG. 23A schematically shows optical operation of the first region 64A in the case that 0 (zero) volt is applied as the lower limit voltage $V_{min}$ between electrodes (no voltage is applied between electrodes). In this case, the bulk 68A is optically anisotropic, and is aligned in the vertical direction. FIG. 23B schematically shows optical operation of the first region 64A in the case that the saturation voltage V7 of the first region 64A is applied as the upper limit voltage $V_{max}$ between electrodes. FIG. 24A schematically shows optical operation of the second region 64B in the case that 0 (zero) volt is applied as the lower limit voltage $V_{min}$ between electrodes. In this case, the bulk 68B is optically isotropic, and is not aligned. FIG. 24B schematically shows optical operation of the second region 64B in the case that the saturation voltage V7 is applied as the upper limit voltage $V_{max}$ between electrodes.

When no voltage is applied between electrodes, for example, a liquid crystal in the fine particles 69A or 69B is oriented in the vertical direction, and thus aligned in the vertical direction as shown in FIGS. 23A and 24A. That is, the fine particles 69A or 69B are optically anisotropic. At that time, a light axis of the liquid crystal in the fine particles 69A or 69B is oriented in the vertical direction, and oriented in the same direction as a direction of a light axis of the bulk 68A or 68B. That is, the direction of the light axis of the liquid crystal in the fine particles 69A or 69B corresponds (is parallel) to the direction of the light axis of the bulk 68A or 68B. The light axis of the liquid crystal in the fine particles 69A or 69B or the light axis of the bulk 68A or 68B need not be necessarily oriented in the vertical direction, and may be oriented in a direction intersecting with the vertical direction due to manufacturing errors or the like. In contrast, when the saturation voltage V7 is applied between electrodes, for example, the liquid crystal in the fine particles 69A or 69B is oriented in a random direction regardless of a direction of an electric field E3, and thus not aligned as shown in FIGS. 23B and 24B. That is, the fine particles 69A or 69B are optically isotropic.

A refractive index of the bulk 68A or 68B is different from a refractive index of the fine particles 69A or 69B when the fine particles are optically isotropic. Ordinary and extraordinary indexes of the bulk 68A are equal to or approximately equal to ordinary and extraordinary indexes of the fine particles 69A or 69B when the fine particles are optically anisotropic.

In the first region 64A, when the saturation voltage V7 is applied between electrodes, a difference in refractive index between the bulk 68A and the fine particles 69A is large in any direction. As a result, the first region 64A has a high light-scattering ability as shown in FIG. 23B. In contrast, in the second region 64B, for example, particle diameter of the fine particles 69B is smaller than particle diameter of the fine particles 69A as shown in FIG. 24B, so that the liquid crystal in the fine particles 69B hardly moves compared with the liquid crystal in the fine particles 69A. Thus, an orientation of the liquid crystal, which has been oriented in a random direction in the fine particles 69B, is substantially not changed, and thus substantially no difference exists in refractive index between the bulk 68B and the fine particles 69B in any direction. As a result, the second region 64B becomes transparent or substantially transparent as shown in FIG. 24B.

When no voltage is applied between electrodes, substantially no difference exists in refractive index between the bulks 68A or 68B and the fine particles 69A or 69B in any direction in each of the first region 64A and the second region 64B. Thus, high transparency is obtained in both the regions as shown in FIGS. 23A and 24A.

Case 2

Figure 25:
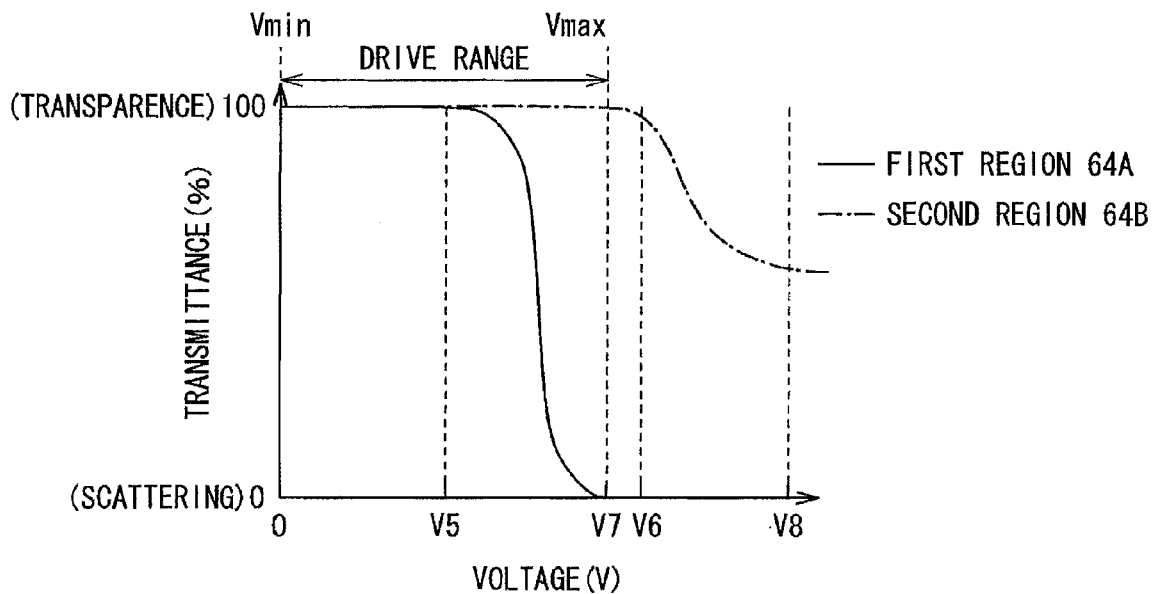
FIG. 25 is a relationship diagram showing another example of the relationship between voltage and transmittance in each of the first and second regions of the light modulator in FIG. 21.

In this case, particle diameter of the fine particles 69B is smaller than that of the fine particles 69A as in the case 1. As a result, for example, a drive start voltage V6 of the second region 64B is higher than a drive start voltage V5 of the first region 64A, and a saturation voltage V8 of the second region 64B is higher than a saturation voltage V7 of the first region 64A as shown in FIG. 25. FIG. 25 schematically shows a relationship between applied voltage and transmittance in each of the first and second regions 64A and 64B.

Furthermore, in the case 2, the weight ratio W4 is smaller than the weight ratio W3 as in the case 1, but the weight ratio W4 is smaller than that in the case 1. As a result, for example, the drive start voltage V6 is larger than the drive start voltage V5, and when the saturation voltage V8 is applied between electrodes, transmittance of the second region 64B is high compared with transmittance of the second region 64B during application of the saturation voltage V8 in the case 1 as shown in FIG. 25.

In the case 2, a drive range defined as a range of a lower limit voltage $V_{min}$, to an upper limit voltage $V_{max}$ is, for example, set as 0 (zero) to V7, thereby the second region 64B may be kept to be transparent or substantially transparent while the first region 64A is changed between a transparent state and a scatterable state. The drive range may be a range other than the above, and, for example, may be 0 (zero) to V6, V5 to V7, or V5 to V6. Hereinafter, an optical characteristic of each region in the case 2 is described.

Figure 26A:
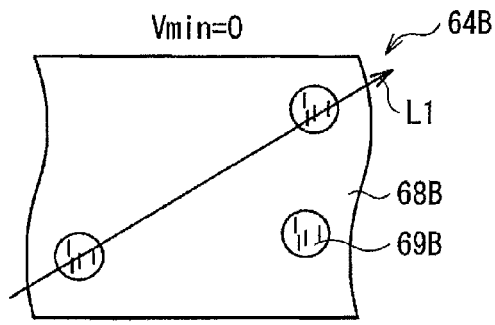
FIGS. 26A and 26B are schematic views for illustrating an example of operation of the second region in FIG. 25.
Figure 26B:
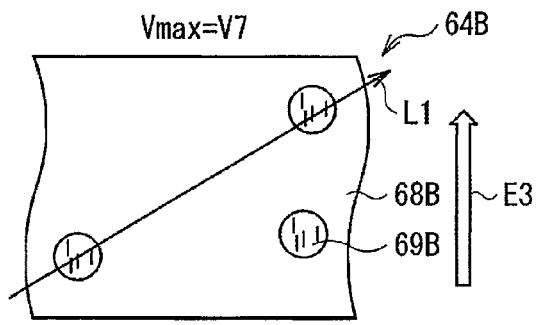
Figure 27A:
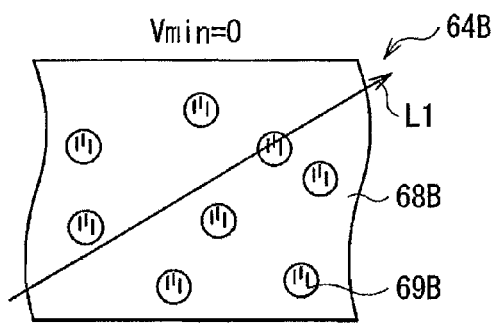
FIGS. 27A and 27B are schematic views for illustrating another example of the operation of the second region in FIG. 25.
Figure 27B:
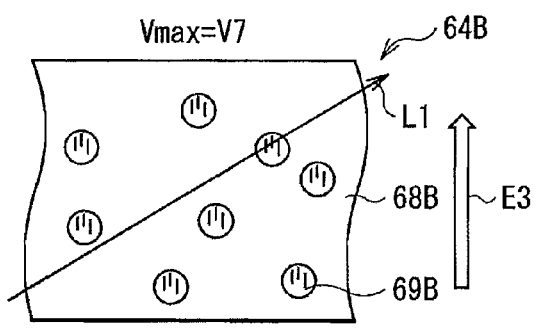

FIGS. 26A and 27A schematically show optical operation of the second region 64B in the case that no voltage is applied between electrodes. In this case, the bulk 68B is optically anisotropic, and thus aligned in the vertical direction. FIGS. 26B and 27B schematically show optical operation of the second region 64B in the case that the saturation voltage V7 is applied as the upper limit voltage $V_{max}$ between electrodes.

In the case 2, for example, an occupancy rate of the bulk 68B in the second region 64B is large compared with that in the case 1 as shown in FIGS. 26A and 26B, or, for example, particle diameter of the fine particles 69B is extremely small compared with that in the case 1 as shown in FIGS. 27A and 27B.

In the case 2, an internal configuration of the first region 64A is the same as that in the case 1. Therefore, when no voltage is applied between electrodes, optical operation of the first region 64A is the same as optical operation as schematically shown in FIG. 23A. Moreover, when the saturation voltage V7 is applied as the upper limit voltage $V_{max}$ between electrodes, optical operation of the first region 64A is the same as optical operation as schematically shown in FIG. 23B.

When no voltage is applied between electrodes, for example, a liquid crystal in the fine particles 69A or 69B is oriented in the vertical direction, and thus aligned in the vertical direction as shown in FIGS. 23A and 26A or FIG. 27A. That is, the fine particles 69A or 69B are optically anisotropic. At that time, a light axis of a liquid crystal in the fine particles 69A or 69B is oriented in the vertical direction, and oriented in the same direction as a direction of a light axis of the bulk 68A or 68B. That is, the direction of the light axis of the liquid crystal in the fine particles 69A or 69B corresponds (is parallel) to the direction of the light axis of the bulk 68A or 68B. The light axis of the liquid crystal in the fine particles 69A or 69B or the light axis of the bulk 68A or 68B need not be necessarily oriented in the vertical direction, and may be oriented in a direction intersecting with the vertical direction, for example, due to manufacturing errors or the like. In contrast, when the saturation voltage V7 is applied between electrodes, for example, the liquid crystal in the fine particles 69A and 69B is oriented in a random direction regardless of a direction of an electric field E3, and thus not aligned as shown in FIGS. 23B and 26B or FIG. 27B. That is, the fine particles 69A or 69B are optically isotropic.

A refractive index of the bulk 68A or 68B is different from a refractive index of the fine particles 69A or 69B when the fine particles are optically isotropic. A refractive index of the bulk 68A is equal to or approximately equal to an extraordinary index of the fine particles 69A or 69B when the fine particles are optically anisotropic.

In the first region 64A, when the saturation V7 is applied between electrodes, a difference in refractive index between the bulk 68A and the fine particles 69A is large in any direction. As a result, the first region 64A has a high light-scattering ability as shown in FIG. 23B. In contrast, in the second region 64B, for example, particle diameter of the fine particles 69B is smaller than particle diameter of the fine particles 69A as shown in FIG. 26B or 27B. Furthermore, an occupancy rate of the bulk 68B in the second region 64B is large compared with that in the case 1, or particle diameter of the fine particles 69B is extremely small compared with that in the case 1. Therefore, scattering in the second region 64B is reduced compared with that in the case 1, or does not occur at all, and transmittance of the second region 64B is thus high compared with that in the case 1. As a result, for example, the second region 64B becomes transparent or substantially transparent as shown in FIG. 26B or 27B.

When no voltage is applied between electrodes, substantially no difference exists in refractive index between the bulk 68A or 68B and the fine particles 69A or 69B in any direction in each of the first and second regions 64A and 64B. Thus, high transparency is obtained in both the regions as shown in FIGS. 26A and 27A.

Case 3

Figure 28:
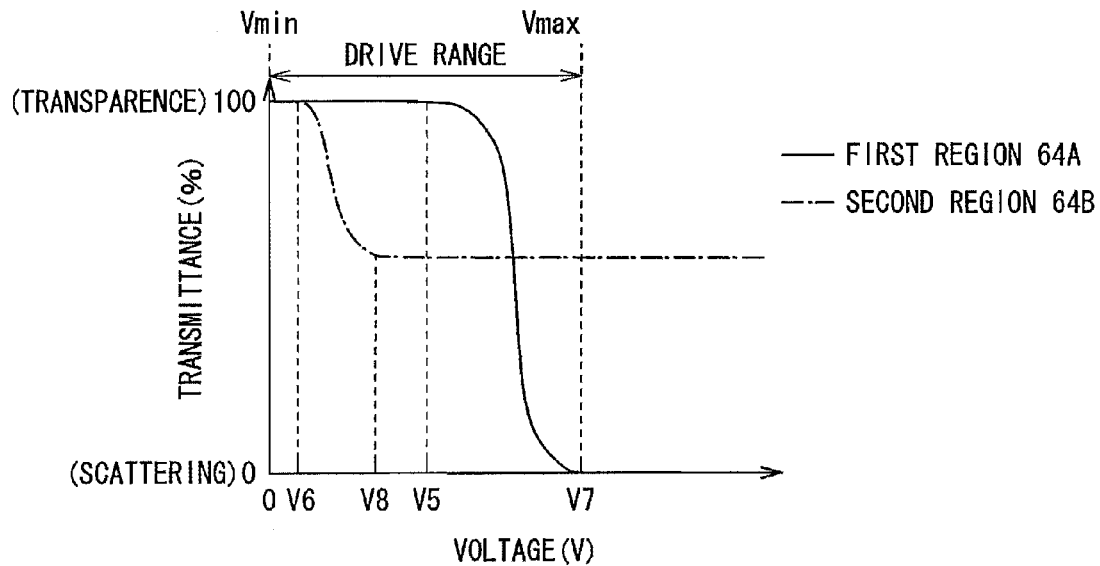
FIG. 28 is a relationship diagram showing still another example of the relationship between voltage and transmittance in each of the first and second regions of the light modulator in FIG. 21.

In this case, particle diameter of the fine particles 69B is larger than that of the fine particles 69A unlike in the case 1 or 2, so that a liquid crystal in the fine particles 69B easily moves compared with a liquid crystal in the fine particles 69A. As a result, for example, a drive start voltage V6 of the second region 64B is smaller than a drive start voltage V5 of the first region 64A as shown in FIG. 28. FIG. 28 schematically shows a relationship between applied voltage and transmittance in each of the first and second regions 64A and 64B.

In the case 3, a weight ratio W4 is smaller than the weight ratio W3 as in the case 2, and the weight ratio W4 is smaller than that in the case 1. As a result, for example, the drive start voltage V6 is smaller than the drive start voltage V5 as shown in FIG. 28, and when a saturation voltage V8 is applied between electrodes, transmittance of the second region 64B is high compared with that in the case 1. That is, in the case 3, the second region 64B is substantially transparent during applying the saturation voltage V7.

In the case 3, a drive range defined as a range of a lower limit voltage $V_{min}$, to an upper limit voltage $V_{max}$ is, for example, set as 0 (zero) to V7, thereby the second region 64B may be kept to be transparent or substantially transparent while the first region 64A is changed between a transparent state and a scatterable state. The drive range may be a range other than the above, and, for example, may be 0 (zero) to V6, V5 to V7, or V5 to V6. Hereinafter, an optical characteristic of each region in the case 3 is described.

Figure 29A:
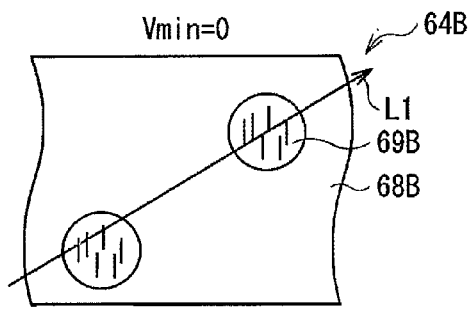
FIGS. 29A and 29B are schematic views for illustrating an example of operation of the second region in FIG. 28.
Figure 29B:
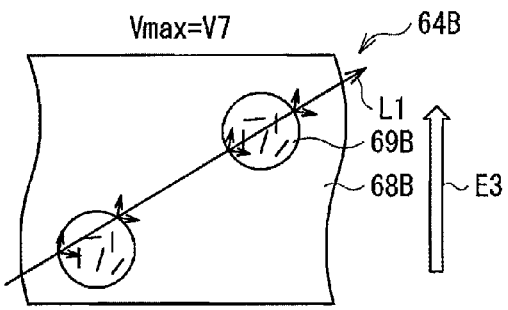
Figure 30A:
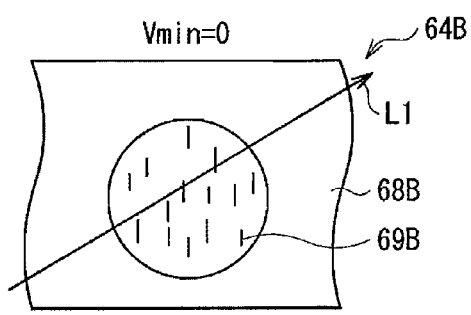
FIGS. 30A and 30B are schematic views for illustrating another example of the operation of the second region in FIG. 28.
Figure 30B:
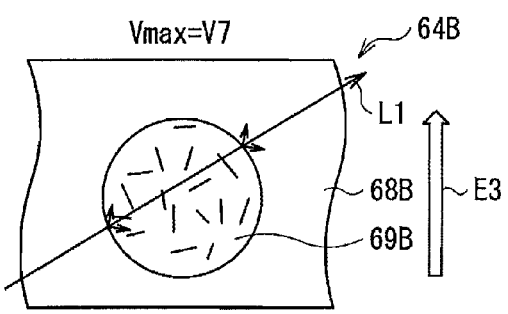

FIGS. 29A and 30A schematically show optical operation of the second region 64B in the case that no voltage is applied between electrodes. In this case, the bulk 68B is optically anisotropic, and thus aligned in the vertical direction. FIGS. 29B and 30B schematically show optical operation of the second region 64B in the case that a saturation voltage V7 is applied as the upper limit voltage $V_{max}$ between electrodes.

In the case 3, for example, an occupancy rate of the bulk 68B in the second region 64B is large compared with that in the case 1 as shown in FIGS. 29A and 29B, or, for example, particle diameter of the fine particles 69B is extremely large compared with that in the case 1 as shown in FIGS. 30A and 30B.

In the case 3, an internal configuration of the first region 64A is the same as that in the case 1. Therefore, when no voltage is applied between electrodes, optical operation of the first region 64A is the same as optical operation as schematically shown in FIG. 23A. Moreover, when the saturation voltage V7 is applied as the upper limit voltage $V_{max}$ between electrodes, optical operation of the first region 64A is the same as optical operation as schematically shown in FIG. 23B.

When no voltage is applied between electrodes, for example, liquid crystal in the fine particles 69A or 69B is oriented in the vertical direction, and thus aligned in the direction as shown in FIGS. 23A and 29A or FIG. 30B. That is, the fine particles 69A or 69B are optically anisotropic. At that time, a light axis of a liquid crystal in the fine particles 69A or 69B is oriented in the vertical direction, and oriented in the same direction as a direction of a light axis of the bulk 68A or 68B. That is, the direction of the light axis of the liquid crystal in the fine particles 69A or 69B corresponds (is parallel) to the direction of the light axis of the bulk 68A or 68B. The light axis of the liquid crystal in the fine particles 69A or 69B or the light axis of the bulk 68A or 68B need not be necessarily oriented in the vertical direction, and may be oriented in a direction intersecting with the vertical direction, for example, due to manufacturing errors or the like. In contrast, when the saturation voltage V7 is applied between electrodes, for example, the liquid crystal in the fine particles 69A or 69B is oriented in a random direction regardless of a direction of an electric field E3, and thus not aligned as shown in FIGS. 23B and 29B or FIG. 30B. That is, the fine particles 69A or 69B are optically isotropic.

A refractive index of the bulk 68A or 68B is different from a refractive index of the fine particles 69A or 69B when the fine particles are optically isotropic. Ordinary and extraordinary indexes of the bulk 68A are equal to or approximately equal to ordinary and extraordinary indexes of the fine particles 69A or 69B when the fine particles are optically anisotropic.

In the first region 64A, when the drive start voltage V7 is applied between electrodes, a difference in refractive index between the bulk 68A and the fine particles 69A is large in any direction. As a result, the first region 64A has a high light-scattering ability as shown in FIG. 23B. In contrast, in the second region 64B, for example, an occupancy rate of the bulk 68B in the second region 64B is large compared with that in the case 1 as shown in FIG. 29B, or, for example, particle diameter of the fine particles 69B is extremely large compared with that in the case 1 as shown in FIG. 30B. Therefore, scattering in the second region 64B is reduced compared with that in the case 1, and transmittance of the second region 64B is thus increased compared with that in the case 1. As a result, for example, the second region 64B becomes substantially transparent despite slight occurrence of scattering in the region 64B as shown in FIG. 29B or 30B.

When no voltage is applied between electrodes, substantially no difference exists in refractive index between the bulk 68A or 68B and the fine particles 69A or 69B in any direction in each of the first and second regions 64A and 64B. Thus, high transparency is obtained in both the regions as shown in FIG. 29A or 30A.

In any of cases 1, 2 and 3, light L (light in an oblique direction), which is emitted from the light source 20, and propagated through the light guide plate 10, is, for example, subjected to the following operation by the light guide plate 10, the light modulator 30, and the reflector plate 40, and then outputted to the outside. Specifically, the light L is transmitted through a region (hereinafter, called transparent region 30A) that becomes transparent by applying no voltage between electrodes, then reflected (for example, perfectly reflected) by an interface between the transparent region 30A and air, and then transmitted through the transparent region 30A again and returned into the light guide plate 10. The light returned into the light guide plate 10 is reflected (for example, perfectly reflected) by a top of the light guide plate 10, and propagated through the light guide plate 10. Therefore, luminance of the transparent region 30A is extremely low compared with a case where the light modulator 30 is not provided (dashed line in FIG. 13B). The light L is scattered within a region (hereinafter, called scattering region 30B), which has light-scattering ability by applying the saturation voltage V7 between electrodes. A part of the scattered light is transmitted through the light guide plate 10, and then outputted to the outside. Another part of the scattered light is reflected by the reflector plate 40, then scattered in the scattering region 30B again, or transmitted through the scattering region 30B, and finally outputted to the outside. Consequently, luminance of the scattering region 30B is extremely high compared with the case where the light modulator 30 is not provided (dashed line in FIG. 13B), in addition, partial white-display luminance (luminance raise) is increased by a level corresponding to decrease in luminance of the transparent region 30A.

The ordinary index of the bulk 68A may be somewhat different from the ordinary index of the fine particles 69A due to manufacturing errors or the like, and such a difference is, for example, preferably 0.1 or less, and more preferably 0.05 or less. Similarly, the extraordinary index of the bulk 68A may be somewhat different from the extraordinary index of the fine particles 69A due to manufacturing errors or the like, and such a difference is, for example, preferably 0.1 or less, and more preferably 0.05 or less.

A refractive index difference (Δn, ordinary index minus extraordinary index) of the bulk 68A, or a refractive index difference (Δn, ordinary index minus extraordinary index) of the fine particles 69A is preferably large to the utmost, and is preferably 0.05 or more, more preferably 0.1 or more, and still more preferably 0.15 or more. This is because when a refractive index difference of each of the bulk 68A and the fine particles 69A is large, the light modulator layer 64 has a high light-scattering ability, so that a light guide condition may be easily broken, consequently light is easily extracted from the light guide plate 10.

Hereinafter, a method of manufacturing the backlight 2 of the embodiment is described. Since the manufacturing method of the embodiment is the same as the manufacturing method of the first embodiment up to a step of disposing the mask M on the transparent substrate 37, subsequent steps are described.

The mask M is disposed on the transparent substrate 37, then light (for example, ultraviolet rays) is irradiated to the exemplified mixture 43 including the liquid crystal material and the polymerizable material via the mask M, the light being weakly irradiated compared with in the case of the first embodiment. Thus, the polymerizable material is polymerized into a polymer in areas weakly irradiated with light, specifically, in areas of the mixture 43 corresponding to openings (not shown) formed in the mask M, in addition, the liquid crystal material and the polymerizable material are phase-separated from each other. As a result, the first region 64A (not shown) is formed in the areas weakly irradiated with light. An occupancy rate of the first region 64A in the mixture 43 is increased with increase in distance from a region where the light source 20 is to be disposed.

Next, light is strongly irradiated to areas where the second region 64B is to be formed. For example, a component having a pattern reverse to a pattern of the mask M is disposed on the transparent substrate 37, and then strong light is irradiated to the relevant areas with the component as a mask. Thus, the polymerizable material is polymerized into a polymer, in addition, the liquid crystal material and the polymerizable material are phase-separated from each other in the areas where the second region 64B is to be formed. As a result, the second region 64B (not shown) is formed in areas of the mixture 43 other than the first regions 64A.

In this way, in the embodiment, the first region 64A and the second region 64B are formed in accordance with intensity of irradiated light and a mask pattern. Moreover, the mask M varies in open area ratio depending on a distance from the region where the light source 20 is to be disposed. Therefore, an occupancy rate of the first region 64A in the mixture 43 may be varied depending on the distance from the region where the light source 20 is to be disposed. In this way, in the embodiment, each of the first region 64A and the second region 64B may be formed in the mixture 43 with an occupancy rate depending on the distance from the region where the light source 20 is to be disposed by using light irradiation using the mask M. In this way, the light modulator 60 is manufactured.

In the manufacturing method, a mask, the open area ratio of which increases with increase in distance from the region where the light source 20 is to be disposed, is used as the mask M. However, another mask may be used instead of the mask having transmissive portions and shading portions discontinuous to each other as in the first embodiment. In the manufacturing steps, cell temperature is preferably not changed during ultraviolet irradiation. In addition, the cell temperature is preferably kept high during that. In such a case, transparency of the second region 64B may be increased. Moreover, an infrared cut filter is preferably used, or UV-LED is preferably used for the light source. Moreover, since ultraviolet rays affect a structure of a composite material, illuminance of ultraviolet rays is preferably appropriately adjusted based on a liquid crystal material or a monomer material to be used, or a composition of the materials.

When droplet diameter of a liquid crystal in the fine particles 69A is desired to be different from that in the fine particles 69B, the same process as exemplified in the first embodiment is preferably used.

Then, the light modulator 60 is bonded to the light guide plate 10, and then lead lines (not shown) are attached to the lower and upper electrodes 32 and 36 respectively. In this way, the backlight 2 of the embodiment is manufactured.

Description has been made on such a process that the light modulator 60 is formed, and finally the light modulator 60 is bonded to the light guide plate 10. However, a transparent substrate 37 having the alignment film 35 formed thereon may be beforehand bonded to a surface of the light guide plate 10 to form the backlight 2. Moreover, the backlight 2 may be formed by either of a sheet-feed method and a roll-to-roll method.

Next, operation and effects of the backlight 2 of the embodiment are described.

In the backlight 2 of the embodiment, light from the light source 20 is incident to the light guide plate 10, and perfectly reflected or reflected with a high reflectance by a top of the light guide plate 10, or by a bottom of a region (transparent region 30A), which becomes transparent by controlling an electric field, of the light modulator layer 64, and propagated through the light guide plate 10 and the light modulator 60. This decreases luminance of an area corresponding to the transparent region 30A in a light emitting area of the backlight 2. In contrast, light propagated through the light guide plate 10 and the light modulator 60 is scattered by a region (scattering region 30B), which has light-scattering ability by controlling an electric field, of the light modulator layer 64. A part of the scattered light, which is transmitted through the bottom of the scattering region 30B, is reflected by the reflector plate 40, and returned to the light guide plate 10, and then outputted from a top of the backlight 2. Another part of the scattered light, which is directed to a top of the scattering region 30B, is transmitted through the light guide plate 10, and then outputted from the top of the backlight 2.

In this way, in the embodiment, light is hardly outputted from the top of the transparent region 30A, and largely outputted from the top of the scattering region 30B. This increases luminance of a region (hereinafter, simply called scattering region in the light emitting area) corresponding to a region having light-scattering ability (scattering region 30B) in the light emitting area of the backlight 2. As a result, a modulation ratio in a front direction is increased.

In the first embodiment, an optically isotropic material is used for the bulk 38A or 38B, and an optically anisotropic material is used for the fine particles 39A or 39B. In contrast, in the embodiment, an optically anisotropic material is used for each of the bulk 68A or 68B and the fine particles 69A or 69B. This may reduce a difference in refractive index between the bulk 68A or 68B and the fine particles 69A or 69B not only in the oblique and lateral directions but also in the vertical direction, leading to high transparency. Thus, since light leakage may be reduced or substantially eliminated in the transparent region 30A, the transparent region 30A may be darkened by a level corresponding to decrease in amount of light leakage, and the scattering region 30B may be lightened by the level. Consequently, in the embodiment, display luminance may be increased while light leakage is reduced or substantially eliminated in the transparent region 30A. As a result, a modulation ratio in a front direction may be increased, and furthermore, luminance raise may be achieved without increasing input power to the backlight 2.

In the embodiment, an occupancy rate of the first region 64A in the light modulator layer 64 is increased with increase in distance from the light source 20. Thus, luminance may be made uniform in a plane not only in a case where the whole light emitting area of the backlight 2 is darkened, but also in a case where the whole light emitting area of the backlight 2 is lightened. As a result, for example, when white display is performed in an area $\alpha_1$ near the light source 20 and in an area $\alpha_2$ away from the light source 20, white luminance may be equalized between both the areas as shown in FIG. 17D. Moreover, for example, when black display is performed in an area $\beta_1$ near the light source 20 compared with the area $\alpha_1$, in an area $\beta_2$ between the area $\alpha_1$ and the area $\alpha_2$, and in area $\beta_3$ away from the light source 20 compared with the area $\alpha_2$, black luminance may be equalized between the areas as shown in FIG. 17D.

APPLICATION EXAMPLE

Next, an application example of the backlight 1 or 2 of the embodiment is described.

Figure 31:
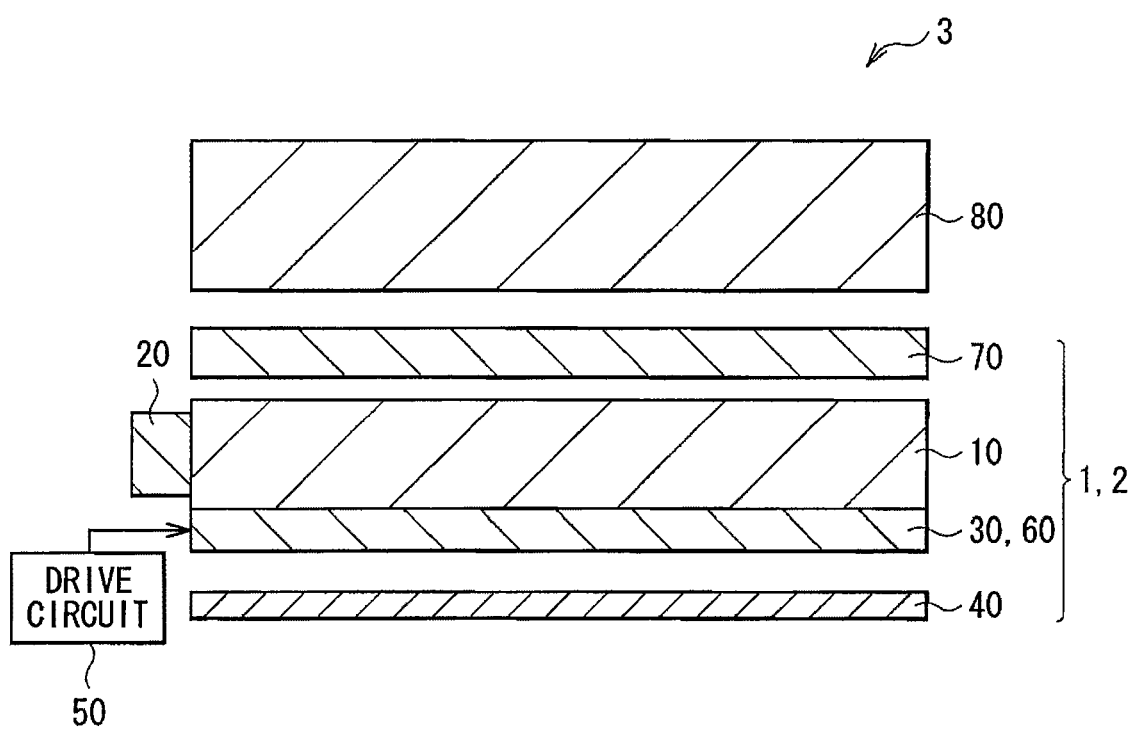
FIG. 31 is a section view showing an example of a display device according to an application example.

FIG. 31 shows an example of a schematic configuration of a display device 3 according to the application example. The display device 3 includes a liquid crystal display panel 80 (display panel), and the backlight 1 or 2 disposed in the back of the liquid crystal display panel 80.

The liquid crystal display panel 80 displays a picture. The panel 80 is, for example, a transmissive display panel in which each pixel is driven according to a picture signal, and has a structure where a liquid crystal layer is sandwiched by a pair of transparent substrates. Specifically, the liquid crystal display panel 80 has a polarizer, a transparent substrate, pixel electrodes, an alignment film, a liquid crystal layer, an alignment film, a common electrode, a color filter, a transparent substrate and a polarizer in order from a backlight 1 side.

Each transparent substrate includes a substrate transparent to visible light, for example, sheet glass. While not shown, an active drive circuit including TFT (Thin Film Transistor) electrically connected to the pixel electrodes and wirings are formed on the transparent substrate on the backlight 1 side. The pixel electrodes and the common electrode include, for example, ITO. The pixel electrodes are lattice-arranged or delta-arranged on the transparent substrate, and act as electrodes for each pixel. On the other hand, the common electrode is formed all over the color filter, and acts as a common electrode opposed to each of the pixel electrodes. The alignment film includes, for example, a high-polymer material such as polyimide, and is to perform alignment processing to a liquid crystal. The liquid crystal layer includes, for example, a liquid crystal of a VA (Vertical Alignment) mode, a TN (Twisted Nematic) mode, or an STN (Super Twisted Nematic) mode, and acts to change a direction of a polarization axis of light emitted from the backlight 1 for each pixel according to a voltage applied from a drive circuit (not shown). Arrangement of the liquid crystal is changed in multi levels, thereby a direction of a transmission axis for each pixel is adjusted in multi levels. The color filter includes color filters arranged in correspondence to arrangement of the pixel electrodes, the color filters dividing light, which has been transmitted through the liquid crystal layer, for example, into three primary colors of red (R), green (G) and blue (B), or into four colors of R, G, B and white (W). Filter arrangement (pixel arrangement) typically includes stripe arrangement, diagonal arrangement, delta arrangement, and rectangle arrangement.

Each polarizer is an optical shutter, and transmits only light (polarized light) in a certain vibration direction. While the polarizer may be an absorption polarizing element absorbing light (polarized light) in a vibration direction other than a transmission axis direction, the polarizer is preferably a reflection polarizing element reflecting light to the backlight 1 side from the point of luminance improvement. The polarizers are disposed such that their polarizing axes are different by 90 degrees from each other, and thus light emitted from the backlight 1 is transmitted through the liquid crystal layer or shut out by the liquid crystal layer.

When the backlight 1 is provided in the back of the liquid crystal display panel 80, the drive circuit 50, for example, controls a level of voltage applied to the pair of electrodes such that a light axis of the fine particles 39A or 39B is perpendicular or approximately perpendicular to a reference surface in one light modulator cell 30A, and a light axis of the fine particles 39A shallowly intersect with the reference surface in the other light modulator cell 30B. When the backlight 2 is provided in the back of the liquid crystal display panel 80, the drive circuit 50, for example, controls a level of voltage applied to the pair of electrodes such that a light axis AX2 of the fine particles 39B is parallel to a light axis AX1 of the bulk 38A in a cell corresponding to a position of a black display pixel in a plurality of light modulator cells 30A, and the light axis AX2 of the fine particles 39B intersects with the light axis AX1 of the bulk 38A in a cell corresponding to a position of a white display pixel in the light modulator cells 30A.

In the application example, when the backlight 1 or 2 of the embodiment is used as a light source for illuminating the liquid crystal display panel 80, a modulation ratio may be increased while luminance is made uniform in a plane. In addition, luminance raise may be achieved without increasing input power to the backlight 1 or 2.

In the application example, the backlight 1 or 2 modulates intensity of light partially incident to the liquid crystal display panel 80 in accordance with a display image. However, when abrupt brightness change occurs at a pattern edge portion of the electrode (lower electrode 32 or upper electrode 36) included in the light modulator 30 or 60, such a boundary portion is inconveniently seen even on a display image. Thus, the backlight is demanded to have a characteristic that brightness monotonously changes to the utmost in an electrode boundary region, and such a characteristic is called gradation characteristic. While use of a diffuser plate having high diffusibility is effective to increase the gradation characteristic, when diffusibility is high, total light transmittance is also reduced, and therefore brightness tends to be reduced. Therefore, when a diffuser plate is used for the optical sheet 70 in the application example, total light transmittance of the diffuser plate is preferably 50% to 85%, and more preferably 60% to 80%. Moreover, the gradation characteristic is improved with increase in spatial distance between the light guide plate 10 and the diffuser plate within the backlight 1 or 2. In addition, number of patterns of the electrode (lower electrode 32 or upper electrode 36) included in the light modulator 30 or 60 may be increased to adjust a voltage of each electrode such that lightness or darkness monotonously changes to the utmost.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method of manufacturing an illumination device, the method comprising:
    forming a light modulator by
    disposing two transparent substrates, each transparent substrate having an electrode and an alignment film formed sequentially on its surface, such that respective alignment films are opposed to each other, and attaching the transparent substrates to each other with a mixture of a liquid crystal material and a polymerizable material in between, and then disposing a mask on the attached transparent substrates, the mask having an open area ratio varying depending on a distance from a region where a light source is to be disposed, and
    irradiating light to the polymerizable material via the mask to polymerize the polymerizable material, thereby forming a first region being changed between a transparent state and a scatterable state depending on an intensity of an electric field, and a second region being more transparent than the first region in a scatterable state at an electric field having a certain intensity, the electric field being applied when the first region is changed between the transparent state and the scatterable state; and
    disposing the light modulator on a surface or in an inside of a light guide plate, and adhering the light modulator to the light guide plate.

2. The method of manufacturing an illumination device according to claim 1,
    wherein the mixture is formed by patterning a plurality of materials being different from one another in weight ratio between the liquid crystal material and the polymerizable material.

* * * * *